US007027885B1

(12) United States Patent
Barto et al.

(10) Patent No.: US 7,027,885 B1
(45) Date of Patent: Apr. 11, 2006

(54) DETERMINING BATCH START VERSUS DELAY

(75) Inventors: Larry D. Barto, Austin, TX (US); Steven C. Nettles, Johnson City, TX (US); Yiwei Li, Austin, TX (US); Gustavo Mata, Austin, TX (US); H. Van Dyke Parunak, Ann Arbor, MI (US)

(73) Assignee: Advanced Micro Devices, Inc., Austin, TX (US)

( * ) Notice: Subject to any disclaimer, the term of this patent is extended or adjusted under 35 U.S.C. 154(b) by 621 days.

(21) Appl. No.: 10/331,598

(22) Filed: Dec. 30, 2002

(51) Int. Cl.
*G06F 19/00* (2006.01)
(52) U.S. Cl. ........................ 700/99; 700/121
(58) Field of Classification Search .................. 700/28, 700/36, 95, 96, 99, 100–104, 121; 705/8, 705/9
See application file for complete search history.

(56) References Cited

U.S. PATENT DOCUMENTS

| | | | |
|---|---|---|---|
| 4,796,194 A | 1/1989 | Atherton | 700/103 |
| 5,093,794 A | 3/1992 | Howie et al. | 700/100 |
| 5,249,120 A * | 9/1993 | Foley | 705/1 |
| 5,258,915 A * | 11/1993 | Billington et al. | 700/103 |
| 5,369,570 A | 11/1994 | Parad | 705/8 |
| 5,375,061 A | 12/1994 | Hara et al. | 700/101 |
| 5,444,632 A | 8/1995 | Kline et al. | 364/468 |
| 5,548,535 A | 8/1996 | Zvonar | 702/81 |
| 5,586,021 A | 12/1996 | Fargher et al. | 700/100 |
| 5,890,134 A | 3/1999 | Fox | 705/9 |
| 5,953,229 A | 9/1999 | Clark et al. | 700/100 |
| 6,038,539 A | 3/2000 | Maruyama et al. | 705/8 |
| 6,088,626 A | 7/2000 | Lilly et al. | 700/100 |
| 6,091,998 A | 7/2000 | Vasko et al. | 700/100 |
| 6,128,542 A | 10/2000 | Kristoff et al. | 700/97 |
| 6,148,239 A | 11/2000 | Funk et al. | 700/1 |
| 6,202,062 B1 | 3/2001 | Cameron et al. | 707/3 |
| 6,263,255 B1 | 7/2001 | Tan et al. | 700/121 |
| 6,356,797 B1 | 3/2002 | Hsieh et al. | 700/101 |
| 6,374,144 B1 | 4/2002 | Viviani et al. | 700/12 |

(Continued)

OTHER PUBLICATIONS

Resende, "Shop Floor Scheduling of Semiconductor Wafer Manufacturing," *University of California, Berkeley* (1987).

(Continued)

*Primary Examiner*—Jayprakash N. Gandhi
*Assistant Examiner*—Chad Rapp
(74) *Attorney, Agent, or Firm*—Williams, Morgan & Amerson, P.C.

(57) ABSTRACT

The invention is a technique by which a manufacturing process flow determines when to begin processing a batch of lots. The invention includes a method for determining whether to begin processing a batch in one aspect and a manufacturing process flow in a second aspect. The method comprises: ascertaining a respective time at which each of a plurality of additional lots will be received into the batch, the batch including a plurality of present lots; assessing a cost for a machine, each additional lot, and each present lot for each respective time at which each additional lot will be received should the machine begin processing the batch at the respective time; and determining the respective time at which the total cost borne by the machine, each additional lot, and each present lot will be at a minimum. The manufacturing process flow comprises a processing tool that processes batch-by-batch, a batch of present lots, a plurality of additional lots that may be included in the batch, and a software agent or a computing system. The software agent/computing system is capable of performing the method set forth above.

34 Claims, 30 Drawing Sheets

U.S. PATENT DOCUMENTS

| | | | |
|---|---|---|---|
| 6,400,999 B1 | 6/2002 | Kashiyama et al. | 700/100 |
| 6,584,369 B1 | 6/2003 | Patel et al. | 700/100 |
| 6,782,302 B1* | 8/2004 | Barto et al. | 700/101 |
| 6,801,819 B1* | 10/2004 | Barto et al. | 700/99 |

OTHER PUBLICATIONS

Glassey et al., "Closed-Loop Release Control for VLSI Circuit Manufacturing," *IEEE Transactions on Semiconductor Manufacturing* 1:36-46 (1988).

"Agent-Enhanced Manufacturing System Initiative," *Technologies for the Integration of Manufacturing Applications (TIMA)* (Oct. 1997).

Ehteshami et al.,"Trade-Offs in Cycle Time Management: Hot Lots", IEEE Transactions on Semiconductor Manufacturing, vol. 5, No. 2, May 1992.

"Factory Integration," *The National Technology Raodmap for Semiconductors: Technology Needs* (1997).

SALSA Enhancements for next Swarm Release (Apr. 22, 1999).

SALSA Exceptions—Minutes from May 11, 1999.

Starvation Avoidance Lot Start Agent (SALSA) (Overview: Apr. 15, 1999).

Starvation Avoidance Lot Start Agent, *Fab25 AEMSI/SALSA Review Meeting* (May 26, 1999).

Starvation Avoidance Lot Start Agent, *Iteration 1 Requirements Kickoff* (May 3, 1999).

Van Parunak, "Review of Axtell and Epstein" (Jun. 23, 1999).

Baumgärtel et al., "Combining Multi-Agent Systems and Constraint Techniques in Production Logistics" (1996).

Bonvik et al., "Improving a Kanban Controlled Production Line Through Rapid Information Dissemination" (Jul. 10, 1995).

Burke et al., "The Distributed Asynchronous Scheduler," pp. 309-339 (1994).

Butler et al., "ADDYMS: Architecture for Distributed Dynamic Manufacturing Scheduling," pp. 199-213 (1996).

Fordyce et al., "Integrating Decision Technologies for Dispatch Scheduling in Semiconductor Manufacturing," *Logistics Management System (LMS)*, pp. 473-516 (1994).

Hynynen, "BOSS: An Artifically Intelligent System for Distributed Factory Scheduling" *Computer Applications in Production and Engineering*, pp. 667-677 (1989).

Interrante et al., "Emergent Agent-Based Scheduling of Manufacturing Systems".

Juba et al., "Production Improvements Using a Forward Scheduler" (1995).

Li et al., "Minimum Inventory Variability Schedule with Applications in Semiconductor Fabrication," *IEEE Transactions on Semiconductor Manufacturing* 9:145-149 (1996).

Lin et al., "Integrated Shop Floor Control Using Autonomous Agents," *IIE Transactions* 24:57-71 (1992).

Lu et al., "Efficient Scheduling Policies to Reduce Mean and Variance of Cycle-Time in Semiconductor Manufacturing Plants," *IEEE Transactions Semiconductor Manufacturing* 7:374-388 (1994).

Martin-Vega et al., "Applying Just-In-Time in a Wafer Fab: A Case Study," *IEEE Transactions on Semiconductor Manufacturing* 2:16-22 (1989).

Murthy et al., "Agent Based Cooperative Scheduling," pp. 112-117 (1997).

Van Parunak et al., "Agents Do It In Time—Experiences with Agent-Based Manufacturing Scheduling" (1999).

Van Parunak et al., "Agents-Based Models & Manufacturing Processes".

Ramos et al., "Scheduling Manufacturing Tasks Considering Due Dates: A New Method Based on Behaviours and Agendas" (1995).

Shen et al., "An Agent-Based Approach for Dynamic Manufacturing Scheduling" (1988).

Hollister, "Scheduling Paper #17 Summary" (Jun. 23, 1999).

Hollister, "Schedule Paper #19 Summary" (Jun. 23, 1999).

Hollister, "Schedule Paper #23 Summary" (Jun. 23, 1999).

Hollister, "Schedule Paper #32 Summary" (Jun. 23, 1999).

Vaario et al., "An Emergent Modelling Method for Dynamic Scheduling," *Journal of Intelligent Manufacturing* 9:129-140 (1998).

Wellman et al., "Auction Protocols for Decentralized Scheduling" (May 22, 1998).

Weber, "Material Traceability—The Missing Link in TAP Systems," *Test, Assembly and Packaging Automation and Integration '99 Conference*.

"ObjectSpace Fab Solutions Semiconductor Product Development Overview" (presented at SEMICON Southwest 1998).

"Agent Enhanced Manufacturing Systems Initiative (AEMSI) Project" (presented by Dan Radin, ERIM CEC Nov. 12-13, 1998).

Weber, "APC Framework: Raising the Standard for Fab Automation and Integration," *Equipment Automation Conference 1$^{st}$ European Symposium on Semiconductor Manufacturing* (Apr. 14, 1999).

Wein, "Scheduling Semiconductor Wafer Fabrication," *IEEE Transactions on Semiconductor Manufacturing* 1:115-130 (1988).

Bonvik, "Performance Analysis of Manufacturing Systems Under Hybrid Control Policies" (Sep. 22, 1995).

Bonvik, "Performance Analysis of Manufacturing Systems Under Hybrid Control Policies" (Oct. 3, 1995).

Sikora et al., "Coordination Mechanisms for Multi-Agent Manufacturing Systems: Applications to Integrated Manufacturing Scheduling," *IEEE Transactions on Engineering Management* 44:175-187 (1997).

Sousa et al., "A Dynamic Scheduling Holon for Manufacturing Orders," *Journal of Intelligent Manufacturing* 9:107-112 (1998).

Upton et al., "Architectures and Auctions in Manufacturing," *Int. J. Computer Integrated Manufacturing* 4:23-33 (1991).

Fordyce et al., "Logistics Management System (LMS): An Advanced Decision Support System for the Fourth Decision Tier-Dispatch or Short Interval Scheduling," pp. 1-58 (1994).

Gere, "Heuristics in Job Shop Scheduling," *Management Science* 13:167-190 (1966).

Ehteshami et al., "Trade-Offs in Cycle Time Management: Hot Lots," *IEEE Transactions on Semiconductor Manufacturing* 5:101-106 (1992).

Axtell et al., "Distributed Computation of Economic Equilbria via Bilateral Exchange" (Mar. 1997).

International Search Report dated Sep. 30, 2003 (PCT/US02/41777; TT4739-PCT)

U.S. Appl. No. 10/331,715, filed Dec. 30, 2002, Nettles et al.

U.S. Appl. No. 10/331,598, filed Dec. 30, 2002, Barto et al.

U.S. Appl. No. 10/331,596, filed Dec. 30, 2002, Barto et al.

U.S. Appl. No. 10/284,705, filed Oct. 31, 2002, Nettles et al.

U.S. Appl. No. 10/233,197, filed Aug. 30, 2002, Barto et al.

U.S. Appl. No. 10/232,145, filed Aug. 30, 2002, Barto et al.

U.S. Appl. No. 10/231,930, filed Aug. 30, 2002, Barto et al.
U.S. Appl. No. 10/231,888, filed Aug. 30, 2002, Barto et al.
U.S. Appl. No. 10/231,849, filed Aug. 30, 2002, Barto et al.
U.S. Appl. No. 10/231,648, filed Aug. 30, 2002, Barto et al.
U.S. Appl. No. 10/231,561, filed Aug. 30, 2002, Barto et al.
U.S. Appl. No. 10/190,194, filed Jul. 3, 2002, Li et al.
U.S. Appl. No. 10/160,990, filed May 31, 2002, Mata et al.
U.S. Appl. No. 10/160,956, filed May 31, 2002, Li et al.
U.S. Appl. No. 10/135,145, filed Apr. 30, 2002, Mata et al.
TBD, Classification of Approach.

Murthy et al., "Agent Based Cooperative Scheduling," pp. 112-117.

Ramos et al., 37 Scheduling Manufacturing Tasks Considering Due Dates: A New Method Based on Behaviours and Agendas.

Fordyce et al., "Logistics Management System (LMS): An Advanced Decision Support System for the Fourth Decision Tier-Dispatch or Short Interval Scheduling,", pp. 1-58.

* cited by examiner

DETERMINING BATCH START VERSUS DELAY

BACKGROUND OF THE INVENTION

1. Field of the Invention

The present invention pertains to the operation and control of a manufacturing process flow, and, more particularly, to deciding when to begin processing an incomplete batch.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The features are placed in localized areas of a semiconducting substrate, and are either conductive, non-conductive, or semi-conductive (i.e., rendered conductive in defined areas with dopants). The fabrication process generally involves processing a number of wafers through a series of fabrication tools. Each fabrication tool performs one or more of four basic operations discussed more fully below. The four basic operations are performed in accordance with an overall process to finally produce the finished semiconductor devices.

Integrated circuits are manufactured from wafers of a semiconducting substrate material. Layers of materials are added, removed, and/or treated during fabrication to create the integrated, electrical circuits that make up the device. The fabrication essentially comprises the following four basic operations:

layering, or adding thin layers of various materials to a wafer from which a semiconductor is produced;
  patterning, or removing selected portions of added layers;
  doping, or placing specific amounts of dopants in selected portions of the wafer through openings in the added layers; and
  heat treating, or heating and cooling the materials to produce desired effects in the processed wafer.

Although there are only four basic operations, they can be combined in hundreds of different ways, depending upon the particular fabrication process. See, e.g., Peter Van Zant, *Microchip Fabrication A Practical Guide to Semiconductor Processing* (3d Ed. 1997 McGraw-Hill Companies, Inc.) (ISBN 0-07-067250-4).

The wafers are processed through a series of process tools that perform one or more of the operations listed above on any given wafer. Frequently, wafers are grouped into lots and processed as "lots." Sometimes, lots of wafers are grouped into "batches," and processed by the batch. The process tools may be referred to in the aggregate as a "process flow." Not all process tools in a process flow perform operations on wafers. Some process tools measure selected aspects of the process flow's performance, and are sometimes more specifically referred to as metrology tools. Wafers, lots, and batches are moved through the process flow, machine by machine according to a schedule. More particularly, a wafer, lot or batch is transported to a machine, the machine performs its scheduled task, and the wafer, lot or batch is transported to the next machine.

Efficient management of a facility for manufacturing products such as semiconductor chips requires monitoring various aspects of the manufacturing process. For example, it is typically desirable to track the amount of raw materials on hand, the status of work-in-process and the status and availability of machines and tools at every step in the process. One of the most important decisions is selecting which lot should run on each machine at any given time. Additionally, most machines used in the manufacturing process require scheduling of routine preventative maintenance ("PM") and equipment qualification ("Qual") procedures, as well as other diagnostic and reconditioning procedures that must be performed on a regular basis, such that the performance of the procedures does not impede the manufacturing process itself.

One approach to this issue implements an automated "Manufacturing Execution System" ("MES"). An automated MES enables a user to view and manipulate, to a limited extent, the status of machines and tools, or "entities," in a manufacturing environment. In addition, an MES enables the dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the MES database with respect to the status of that entity. Alternatively, if an entity is to be taken down for repair or maintenance, the operator will log this information into the MES database, which then prevents use of the entity until it is subsequently logged back up.

Although MES systems are sufficient for tracking lots and machines, such systems suffer several deficiencies, the most obvious of which are their passive nature, lack of advance scheduling, and inability to support highly automated factory operations Current MES systems largely depend on manufacturing personnel for monitoring factory state and initiating activities at the correct time. For example, a lot does not begin processing until a wafer fab technician ("WFT") issues the appropriate MES command. And, prior to processing, a WFT must issue an MES command to retrieve the lot from the automated material handling system ("AMHS") with sufficient advance planning that the lot is available at the machine when the machine becomes available. If the WFT does not retrieve the lot soon enough, or neglects to initiate processing at the earliest available time, the machine becomes idle and production is adversely impacted.

The present invention is directed to resolving, or at least reducing, one or all of the problems mentioned above.

SUMMARY OF THE INVENTION

The invention is a technique by which a manufacturing process flow determines when to delay processing a batch of lots. The invention includes a method for determining whether to begin processing an incomplete batch and a manufacturing process flow in which such a method may be implemented. The method comprises:

ascertaining a respective time at which each of a plurality of additional lots will be received into the incomplete batch, the incomplete batch including a plurality of present lots;

assessing a cost for a machine, each additional lot, and each present lot for each respective time at which each additional lot will be received should the machine begin processing the incomplete batch at the respective time; and determining the respective time at which the total cost borne by the machine, each additional lot, and each present lot will be at a minimum.

The manufacturing process flow comprises a processing tool that processes batch-by-batch, an incomplete batch of present lots, a plurality of additional lots that may be included in the incomplete batch, and a software agent or a computing system. The software agent/computing system is capable of performing the method set forth above.

BRIEF DESCRIPTION OF THE DRAWINGS

The invention may be understood by reference to the following description taken in conjunction with the accompanying drawings, in which like reference numerals identify like elements, and in which:

FIG. 4, FIG. 5, FIG. 6A–FIG. 6H, and FIG. 7A–FIG. 7K illustrate a decision making process for a processing flow implementing one particular embodiment of the process flow in FIG. 1 and the method of FIG. 3, wherein:

FIG. 4 illustrates the opening of the decision making process wherein the fullness of the batch and the readiness of its participants direct the rest of the decision making process;

FIG. 5 conceptually illustrates in a block diagram the process flow in which the decision-making process occurs;

FIG. 6A–FIG. 6H illustrate the decision making process if one or more of the participants in the batch is not ready for processing; and FIG. 7A–FIG. 7K illustrate the decision making process if the participants in the batch are ready, but the batch is not full;

Figure 1:
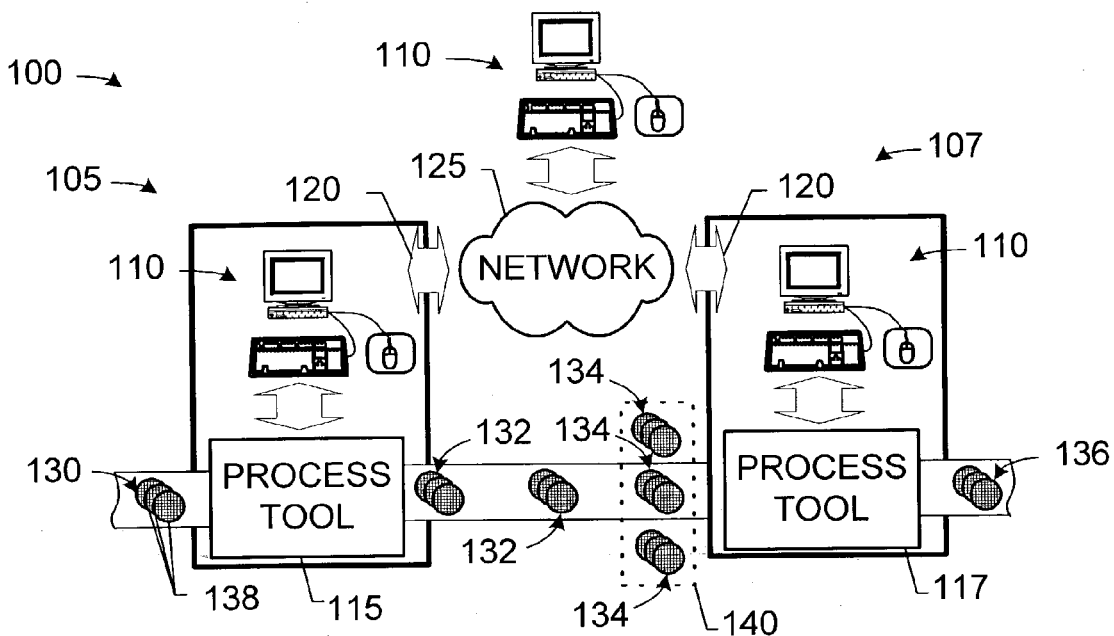
FIG. 1 conceptually illustrates a portion of one particular embodiment of a first process flow constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130, 132, 134, 136 comprise semiconducting wafers 138 from which semiconductor devices will be fabricated. The process tools 115, 117 and any process operation performed thereon need not necessarily be related to the manufacture of semiconductor devices in all embodiments. However, for the sake of clarity and to further an understanding of the invention, the terminology pertaining to semiconductor fabrication shall be retained in disclosing the invention in the context of the illustrated embodiments.

The illustrated portion of the process flow 100 includes two stations 105,107, each station 105,107 including a computing device 110 communicating with a respective process tool 115, 117. The stations 105,107 communicate with one another over a communications links 120. In the illustrated embodiment, the computing devices 110 and the communications links 120 comprise a portion of a larger computing system, e.g., a network 125. The process tools 115, 117 are shown in FIG. 1 processing lots 130, 132, 134, 136 of wafers 138 that will eventually become integrated circuit devices.

Figure 2:
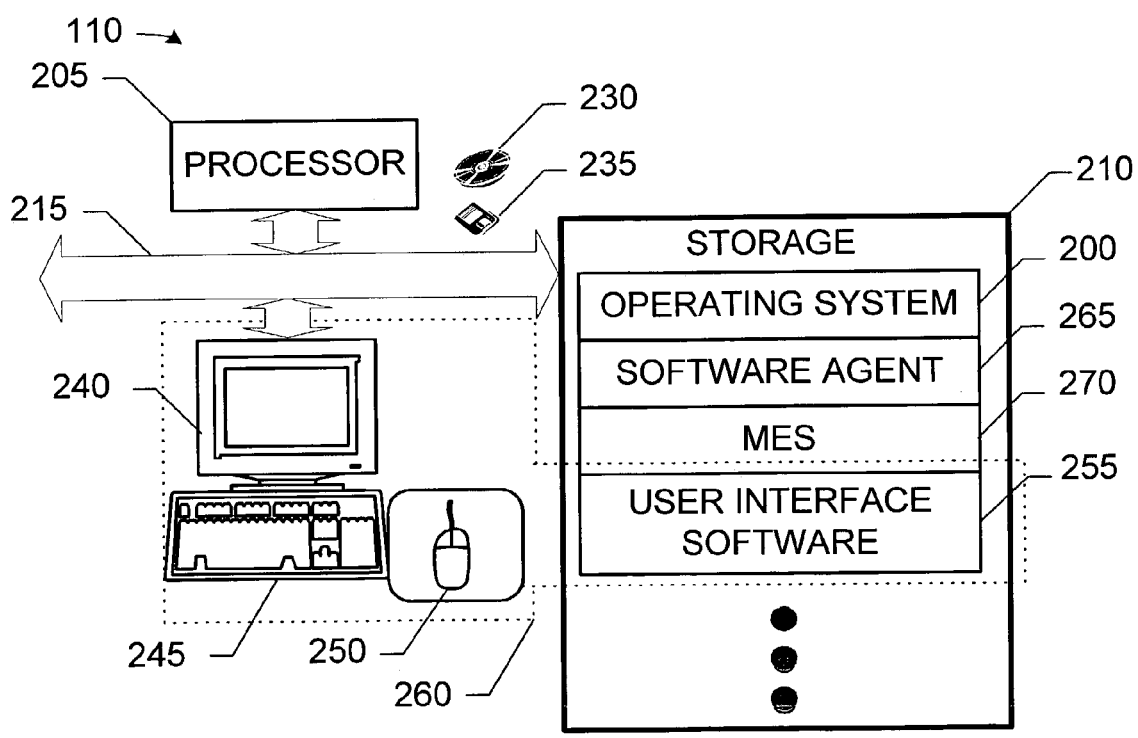
FIG. 2 conceptually illustrates, in a partial block diagram, selected portions of the hardware and software architectures, respectively, of the computing devices in FIG. 1.

FIG. 2 depicts selected portions of the hardware and software architectures, respectively, of the computing devices 110 programmed and operated in accordance with the present invention. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 will include many such routine features.

In the illustrated embodiment, the computing device 110 is a workstation, employing a UNIX-based operating system 200, but the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115, 117. The invention also is not limited to UNIX-based operating systems. Alternative operating systems (e.g., Windows™—based or disk operating system ("DOS")-based) may also be employed. The invention is not limited by the particular implementation of the computing device 110.

The computing device 110 also includes a processor 205 communicating with storage 210 over a bus system 215. The storage 210 typically includes at least a hard disk 220 and random access memory ("RAM") 225. The computing device 110 may also, in some embodiments, include removable storage such as an optical disk 230, a floppy electromagnetic disk 235, or some other form such as a magnetic tape or a zip disk (not shown). The processor 205 may be any suitable processor known to the art. For instance, the processor may be a general purpose microprocessor. In the illustrated embodiment, the processor 205 is an Athlon™ 32-bit processor commercially available from Advanced Micro Devices, Inc. ("AMD"), but the invention is not so limited. The 64-bit UltraSPARC™ or the 32-bit microSPARC™ from Sun Microsystems, any of the Itanium™ or Pentium™—class processors from Intel Corporation, and the Alpha™ processor from Compaq Computer Corporation might alternatively be employed. The computing device 110 includes a monitor 240, keyboard 245, and a mouse 250, which together, along with their associated user interface software 255 (shown in FIG. 2) comprise a user interface 260. The user interface in the illustrated embodiment is a graphical user interface ("GUI"), although this is not necessary to the practice of the invention.

FIG. 2 illustrates selected portions of the software architecture of the computing devices 110. Each computing device 110 includes, in the illustrated embodiment, a software agent 265, such as is known in the art, residing thereon in the storage 210. In one particular implementation, the software agent is specialized to perform a single function (e.g., scheduling or processing) for a particular entity (e.g., a lot or a particular kind of machine). Note that the software agents 265 may reside in the process flow 100 in places other than the computing devices 10. The situs of the software agent 265 is not material to the practice of the invention. Note also that, since the situs of the software agents 265 is not material, some computing devices 110 may have multiple software agents 265 residing thereon while other computing devices 110 may not have any. An automated MES 270, such as WORKSTREAM™, resides on at least one computing device 110.

Returning briefly to FIG. 1, as was mentioned above, the computing devices 110 may also be part of a larger computing system 125 by a connection over the communications links 120. Exemplary computing systems in such an implementation include local area networks ("LANs"), wide area networks ("WANs"), system area networks ("SANs"), intranets, or even the Internet. The computing system 125 employs a networked client/server architecture, but alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The computing system 125, in embodiments employing one, and the communications links 120 are implementation specific and may be implemented in any suitable manner known to the art. The computing system 125 may employ any suitable communications protocol known to the art, e.g., Transmission Control Protocol/Internet Protocol ("TCP/IP").

Referring now to FIG. 1 and FIG. 2, the software agents 265, collectively, are responsible for efficiently scheduling and controlling the lots 130, 132, 134, 136 through the process flow 100. Each process tool 115, 117 represents a resource that may be employed for this purpose. For instance, the process tools 115, 117 may be fabrication tools used to fabricate some portion of the wafers 138, i.e., layer, pattern, dope, or heat treat the wafers 138. Or, the process tools 115, 117 may be metrology tools used to evaluate the performance of various parts of the process flow 100. Thus, the software agents 265 are capable of assessing a plurality of resources for subsequent processing of the lots 130, 132, 134, 136 of wafers 138, allocating the resources represented by the process tools 115, 117, and negotiating among themselves for the allocation of those resources for subsequent processing of the lot 130, 132, 134, 136 of wafers 138.

In the illustrated embodiment, the software agents 265 are self-configuring on start-up, intelligent, state aware, and imbued with specific goals for which they autonomously initiate behaviors to achieve. The software agents are also self-adjusting as their environment changes. The software agents 265 are implemented as objects in an object oriented programming ("OOP") environment, but the invention may be implemented using techniques that are not object oriented. The behavior is designed to achieve selected goals such as achieving an assigned lot due date, achieving a predefined level of quality, maximizing machine utilization, and scheduling opportunistic preventive maintenance. In furtherance of these objectives, the software agents 265 interface with the MES 270 and are integrated with other existing factory control systems (not shown). As will be apparent to those skilled in the art having the benefit of this disclosure, the manner in which this interface and integration occurs is implementation specific, depending upon the makeup and configuration of the MES 270 and the factory control systems.

Collectively, the software agents 265 schedule ahead for each lot 130, 132, 134, 136 one or more operations on a specific qualified process tool 115, 117, including transports and required resources, as discussed more fully below. This includes making optimizing decisions such as running an incomplete batch, as opposed to waiting for an approaching lot 130, 132, 134, 136, in accordance with the present invention. The software agents 265 schedule activities such as initiating lot transport and processing, performing MES transactions, monitoring processing and transport, and reacting to deviations from scheduled activities or unscheduled activities. The manner in which these activities are scheduled is not material to the practice of the invention. Any suitable scheduling technique known to the art may be used.

As mentioned, the software agents 265 determine whether a process tool 115, 117 should begin processing with an incomplete batch in accordance with the present invention. The software agents 265 also actually implement that decision in the illustrated embodiment. However, this is not necessary to the practice of the invention. The software agents 265 may, in alternative embodiments, simply make the determination and communicate that determination to a WFT through the user interface 260. The WFT can then decide whether to act in accordance with that determination or whether to override it. Note also that some embodiments might implement the software agent 265 as a subroutine or some other program structure.

Referring now specifically to FIG. 1, the process tool 117 processes on a batch-by-batch basis. FIG. 1 shows an incomplete batch 140 of lots 134 already present at the process tool 117 (i.e., "present lots") and awaiting processing. The process tool 117 is awaiting the arrival of additional non-participating lots 132 that can be included in the incomplete batch 140 when they arrive at the process tool 117. Note that the future non-participating lots 132 are all arriving at the process tool 117 in the embodiment of FIG. 1 from a single process tool, i.e., the process tool 115. However, this is not necessary to the practice of the invention. The process tool 117 can receive future non-participating lots 132 from any number of machines upstream in the process flow 100.

Although the process tool 117 is waiting for the batch 140 to become complete, efficiency concerns may dictate that the process tool 117 should begin processing while the batch 140 is incomplete. The process tool 117, or—more precisely—the software agent 265 for the process tool 117, assesses whether and when to begin processing or to delay. Thus, in cases where the batch 140 is not filled at the time it is scheduled to start, the software agent 265 for the process tool 117 may elect to delay the processing of the batch so that other lots may be added. The software agent 265 also determines whether it should delay a batch, whether complete or incomplete, when one of the lots 134 currently participating in the batch 140 requests to shift the start time to a later time because it cannot be ready at the scheduled start time.

Figure 3:
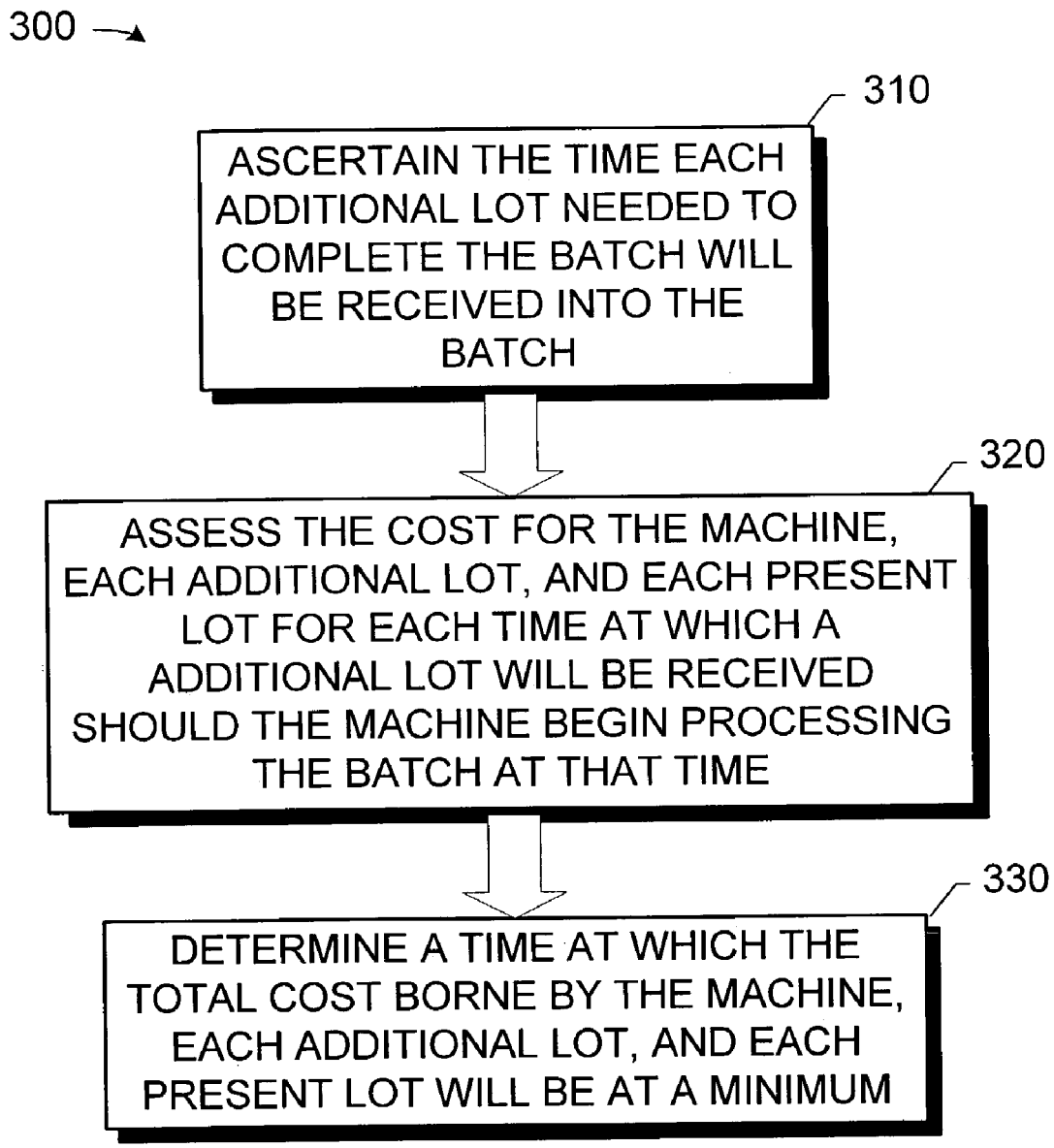
FIG. 3 illustrates one method for determining whether to begin processing with an incomplete batch or to wait for the batch to complete practice in accordance with the present invention.

FIG. 3 conceptually illustrates one embodiment of a method 300 by which a process tool, e.g., the process tool 117, decides when to begin processing. Generally, the method 300 comprises:

ascertaining the time at which each additional lot (e.g., the non-participating lots 132) will be received into an batch (e.g., the batch 140), as set forth in the box 310;

assessing a cost for a machine (e.g., the process tool 117), each additional lot, and each present lot (e.g., the lots 134) for each time at which each additional lot will be received should the machine begin processing the batch at that time, as set forth in the box 320; and determining the time at which the total cost borne by the machine, each additional lot, and each present lot will be at a minimum, as set forth in the box 330.

Stated in a more technical fashion:

ascertaining a time $t_i$ at which each of N lots $L_i$ (e.g., the non-participating lots 132) needed to complete the batch (e.g., the batch 140) will become available, where $1 \leq i \leq N$, assessing a cost borne by a machine (e.g., the process tool 117) at each time $t_i$ should the machine begin processing the batch at the respective time $t_i$;

assessing a cost borne by each of the additional lots $L_i$ at each time $t_i$ should the machine begin processing the batch at the respective time $t_i$;

assessing a cost borne by each of a plurality of lots $L_x$ (e.g., the lots 134) originally in the batch at each time $t_i$ should the machine begin processing the batch at the respective time $t_i$;

assessing a cost borne by each of a plurality of lots $L_y$ already scheduled in a later batch on the same machine (these lots $L_y$ may complete processing at a later time if their start time is delayed); and determining the time $t_i$ at which the total cost borne by the machine, by the lots $L_i$, $L_x$, and $L_y$ is least.

The "costs" are figurative and may be assessed in a variety of ways. One particular way to assess the costs is discussed more fully below.

In essence, time is assigned a value, and the costs are assigned in a manner reflecting the value of time to the lots 132, 134, 136 and the process tool 117. The process tool 117 then attempts to optimize the value of the time associated with waiting versus the value of the time associated with beginning processing. This optimization considers the cost borne by both the lots 132, 134, 136 and the process tool 117, but ultimately reflects the optimal value to the process flow 100 as a whole. Thus, time value for individual lots 132, 134, 136 or the process tool 117 may not be optimized with any given decision—that is, individual lots or the process tool 117 may have to bear a heavier proportion of the cost as a result of the decision.

Note also that the present invention employs a priori knowledge of when lots not currently in the incomplete batch can join the batch. This knowledge can be gleaned from the various scheduling and reporting mechanism currently found in most process flows. For instance, the MES 270 in FIG. 2 typically incorporates at least rudimentary scheduling and reporting mechanisms that can be employed for this purpose. Alternatively, additional software components (not shown) may be implemented specifically to track events in the process flow, such as the completion of process operations and/or moves, from which such information can be directly obtained or inferred. The manner in which this information is obtained is not material to the practice of the invention.

Thus, returning to FIG. 1, the process tool 117 is forming a batch 140 of present lots 134 for processing. The process tool 117, through its software agent 265, is aware that the batch 140 is incomplete and that additional lots 132 will be available for processing in the batch 140 if it waits long enough. The software agent 265 then determines a time $t_i$ at which each lot 132 can join the incomplete batch 140. The software agent 265 then determines the total cost borne by the process tool 117, the lots 134, 132, and the lots in the next batch 520 that may be delayed to wait for processing until each time $t_i$ in accordance with the method 300 shown in FIG. 3. The software agent 265 then identifies the $t_i$ at which this total cost is a minimum and schedules processing to begin at that time. Note that events may occur that change the conditions in the process flow 100 while the process tool 117 is waiting to begin processing. For instance, a number of additional non-participating lots 132 may unexpectedly finish previous processing early, and become available earlier than was originally thought. This would allow the software agent 265 to shift the batch to an earlier start time.

As was previously mentioned, in this particular embodiment, the software agents 265 in FIG. 2 are implemented using object-oriented programming techniques, although alternative programming techniques may be employed in alternative embodiments. In the terminology of object-oriented computing, a software "agent" is an autonomous, active object. Given its set of operations, a software agent can take independent action in response to local conditions, thereby generating adaptable system behavior. One skilled in the art will recognize that an agent or other software object can include one or more software objects. As used herein, the term "object" will be understood to be a software object that may, in turn, be composed of other software objects. Conversely, one skilled in the art will also recognize that the functionality of one object may combined with other functionalities. It is to be understood that functionalities described as being associated with separate objects may be combined into the functionality associated with a single object.

Thus, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 4:
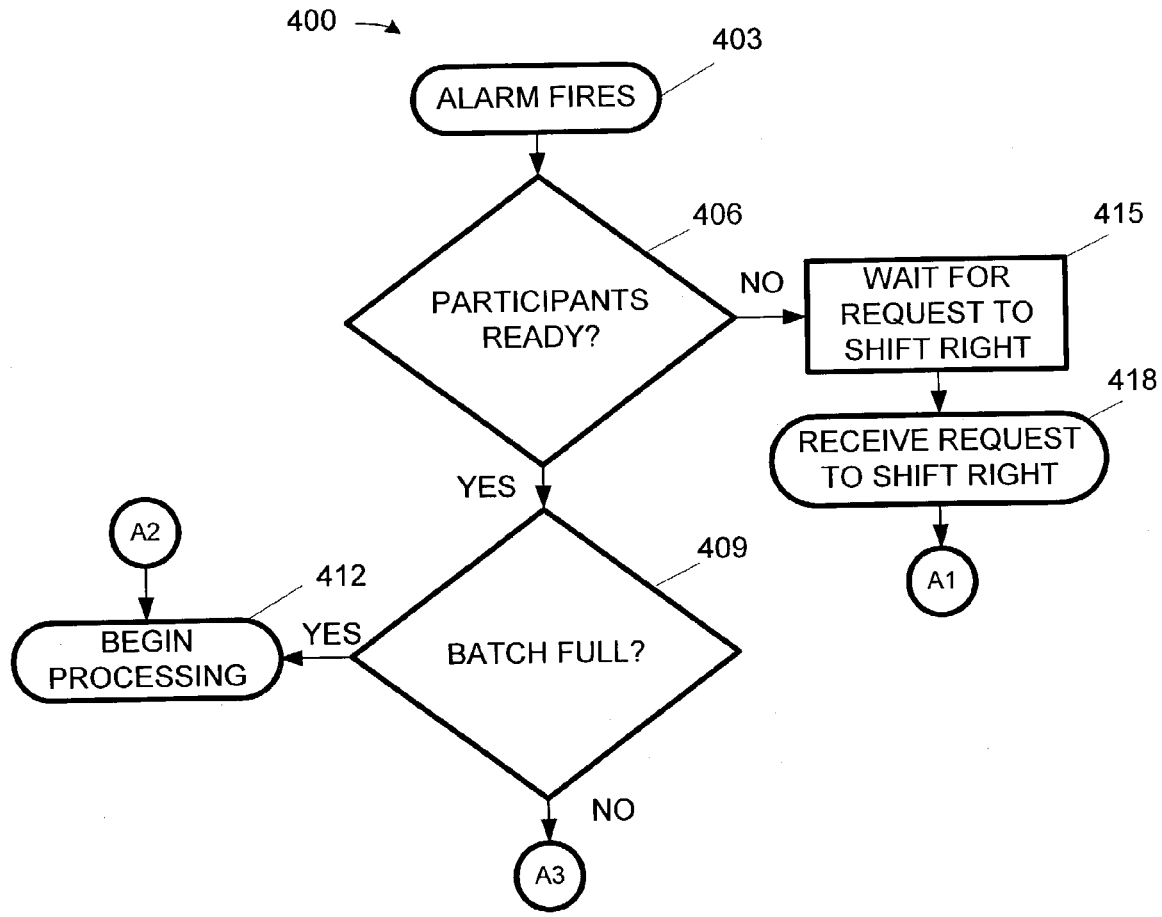
Figure 5:
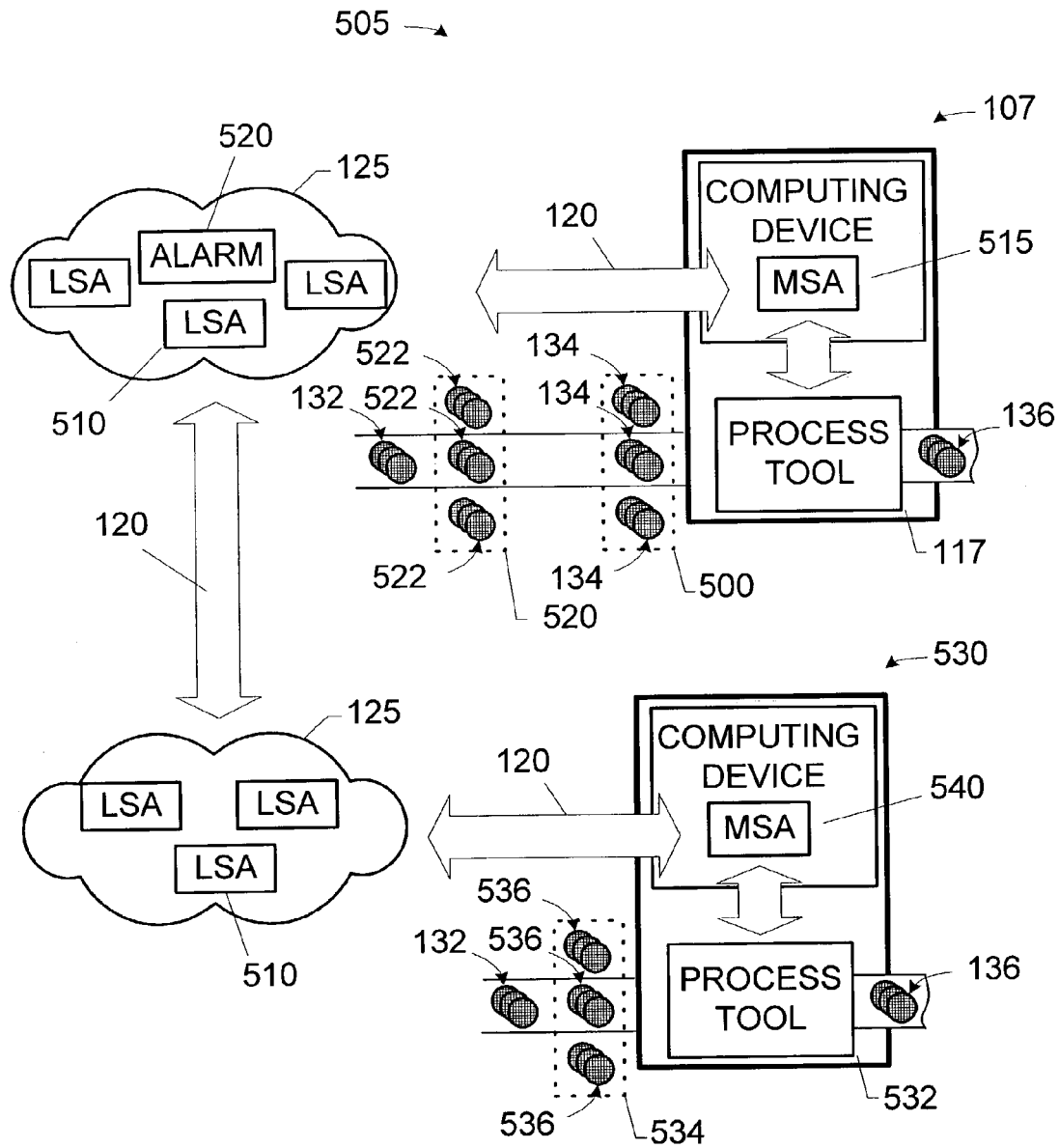

FIG. 4, FIG. 5, FIG. 6A–FIG. 6H, and FIG. 7A–FIG. 7K illustrate a decision making process for a processing flow implementing one particular embodiment of the process flow in FIG. 1 and the method of FIG. 3, wherein:

FIG. 4 illustrates the opening of the decision making process wherein the fullness of the batch and the readiness of its participants direct the rest of the decision making process;

FIG. 5 conceptually illustrates in a block diagram the process flow in which the decision-making process occurs;

FIG. 6A–FIG. 6H illustrate the decision making process if one or more of the participants in the batch is not ready for processing, or if a participant lot requests to shift a batch to a later start time before the scheduled start time arrives; and FIG. 7A–FIG. 7K illustrate the decision making process if the participants in the batch are ready, but the batch is not full.

Each lot 132, 134, 136 has a corresponding lot scheduling agent ("LSA") 510 (not all shown, only one indicated) on the network 125. In FIG. 5, the lots 134 are "participants" in the batch 500 and the lot 132 is a lot that may become a participant in the batch 500. The processing tool 117 has a machine scheduling agent ("MSA") 515. The MSA 515 decides, on the basis of information provided by the LSAs 510 and other sources, whether to start or delay processing the batch 500 in accordance with the present invention as illustrated in FIG. 4.

A "next" batch 520, including several participants 522, is scheduled on the process tool 117 waiting for its turn to process. The next batch 520 is scheduled for processing on the process tool 117 after the current batch 500. Note that the next batch 520 and the current batch 500 may be in various stages of completeness and/or readiness, and that the states may differ between the current batch 500 and the next batch 520. For example, the current batch 500 may be full and the participants 134 ready while the next batch 520 may not be full and/or one or more of the participants 520 may not be ready. The converse may also be true. Note also that, at different times, there may not be a "next" batch 520 on the process tool 117.

In the illustrated embodiment, the process flow 505 also includes a second processing station 530, comprising a second process tool 532. The second process tool 532 has thereon a batch 534 awaiting processing. The batch 534 comprises several participants 536, and may be full or incomplete, ready or unready, as the case may be. Each of the participants 536 has a corresponding LSA 510 (not all shown, only one indicated). The processing tool 532 also has a corresponding MSA 540. The roles of the next batch 520 and the second processing station 530 in the illustrated embodiment will become apparent in the discussion below.

As was mentioned above, the illustrated embodiment is implemented using object oriented programming ("OOP") techniques. As those in the art having the benefit of this disclosure will appreciate, FIG. 4, FIG. 6A–FIG. 6H, and FIG. 7A–FIG. 7K are therefore not "flowcharts" in the conventional sense. These drawings instead merely represent one manifestation of the decision-making process implemented by the MSA 515 and the LSAs 510. Also, the following description occasionally states that an agent performs some act. Again as those in the art having the benefit of this description will appreciate, in an OOP environment, objects such as the MSA 515 and the LSAs 510 typically call various methods, passing them parameters, to perform numerous functions. In the following description, for the sake of clarity and so as not to obscure the invention, the details regarding calls to methods, etc., are omitted.

Referring now to both FIG. 4 and FIG. 5, when the batch processing appointment for processing the current batch 500 is scheduled, an "alarm" 520 is set. The alarm 520 fires (at 403) when the time for the batch processing appointment arrives. The MSA 515 for the process tool 117, upon receiving the alarm 510, proceeds to determine whether to start or delay processing, depending on a number of factors—primarily the readiness of the participants 134 and the size of the current batch 500. Alternatively, a participant 134 in a current batch 500 may not be able to make the scheduled start time for the batch 500, and request (at 418) that the start time be shifted later in time to accommodate its late arrival. The MSA 515 also considers whether to start or delay processing at the scheduled start time in this circumstance. The processing tool 117 has a "maximum" batch size. Ideally, the current batch 500 will be full, i.e., the current batch size will equal the maximum batch size, and all the participants 134 will be ready for processing when it is time to start processing. However, this may not be the case. Hence, the decision making process illustrated in FIG. 4.

If the alarm fires, the MSA 515 first determines (at 406) whether all the participants 134 in the batch 500 are ready (i.e., have arrived and been loaded on the process tool 117) and (at 409) if the batch 500 is full (i.e., the number of participants 134 equals the maximum batch size). If so, then processing starts (at 412). If one or more of the participants 134 is not ready (at 406), the MSA 515 stops and waits (at 415) for the unready participant 134 to request that the batch processing appointment be shifted right, or later in time. When the request is received (at 418), then MSA 515 then follows the path 600 in FIG. 6A, which will be discussed further below. If the participants 134 are ready (at 406) but the batch is not full (at 409), the MSA 515 then proceeds on the path 700 in FIG. 7A, discussed in further detail below, to decide whether to start or delay processing the batch 500.

Figure 6A:
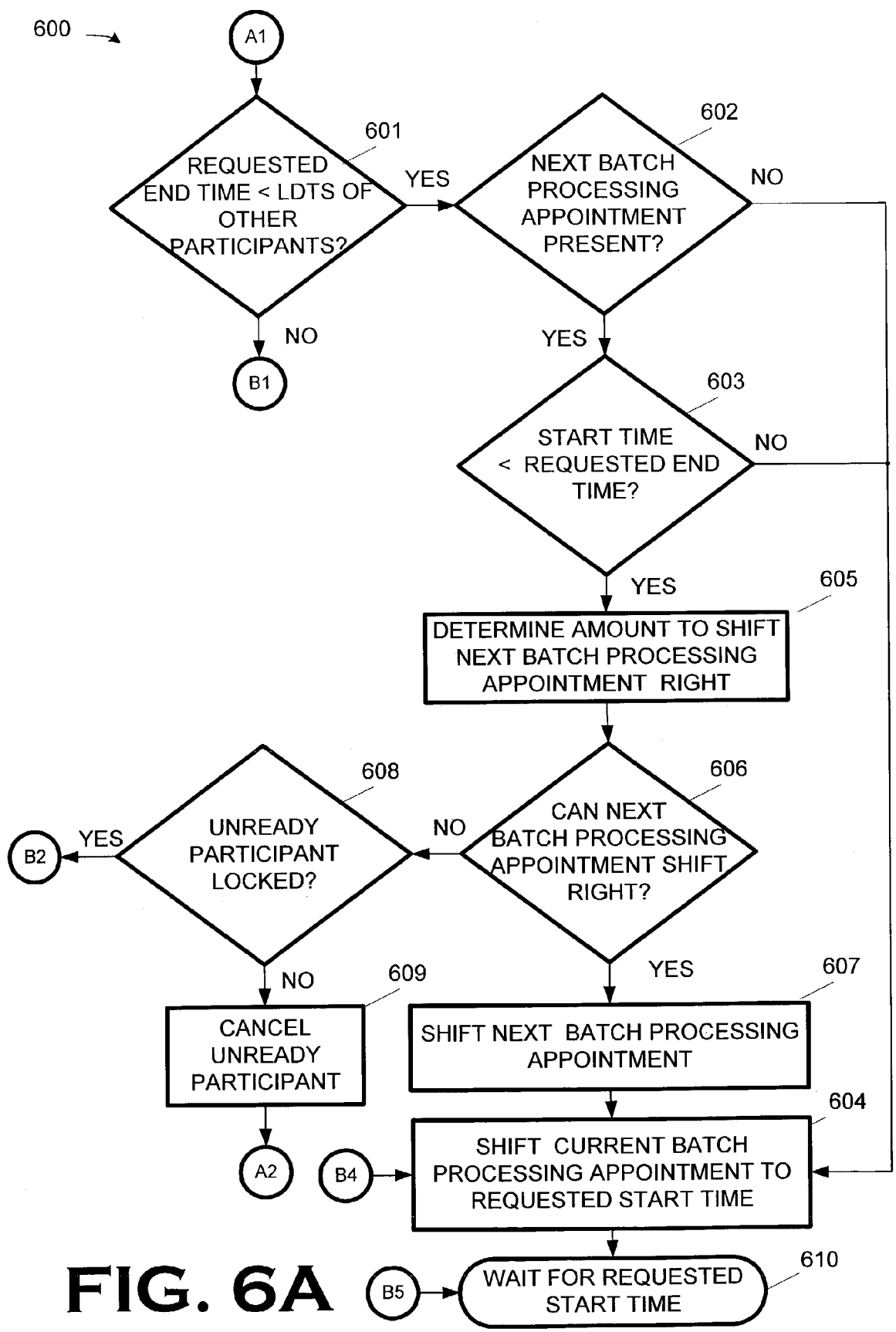

Turning now to FIG. 6A, we pursue the case wherein one or more of the participants 134 is unready or where a lot requests to shift a batch to a later start time before the scheduled start time arrives. The participant 134 may be unready because, e.g., it is not yet loaded onto the processing tool 117. Or, the lot may request a shift, e.g., because a preceding move or processing appointment runs longer than expected. The path 600 is triggered by receipt (at 418, in FIG. 4) of a request to shift the current batch processing appointment right, or later in time. The current batch processing appointment is defined by a current start time, a current end time, and a resulting duration. The requesting participant 134 requests the current batch processing appointment be shifted to a new "end time," hereafter called the "requested" end time. The duration remains unchanged, and so the requested end time necessarily implies a new start time, hereafter called the "requested" start time. The requested start time is one at which the requesting participant 134 will be ready to process.

The scheduling process engaged in by the MSA 515 and the LSAs 510 specifies a "latest delivery time" ("LDT"), which is the latest time at which the processing tool 117 will "deliver" the participant 134, or finish the processing. Note that the actual end time for the batch processing appointment may, and frequently will, be different from the LDT promised to the individual participants 134. The current batch 500 also has a LDT that is the latest time at which the batch 500 will be delivered, and is later in time (or, "greater") than or equal to each of the lot LDTs. The MSA 515 first determines (at 601) whether this requested end time is later than the batch LDT.

If the requested end time is less than the batch LDT, it may be possible to shift the batch processing appointment to the requested end time. If the only participant 134 whose LDT is earlier than the requested end time is the unready participant 134, its LDT is set to the requested end time on the basis of its request for the requested end time. The MSA 515 then checks (at 602) to see if there is a "next" or subsequent batch processing appointment. The next batch processing appointment is the batch processing appointment scheduled by the MSA 515 for the processing tool 117 to process the next batch 520 after the current batch 500.

If there is no next batch processing appointment (at 602), or if there is a "next" batch processing appointment whose start time is later than the requested end time (at 603), then the current batch processing appointment is shifted right (at 604) as requested. If the start time of the next appointment is earlier than the requested end time (at 603), then the MSA 515 determines (at 605) the amount the next appointment needs to shift right to accommodate the shift of the present batch processing appointment to the requested end time. If the next batch processing appointment can shift right (at 606) by the needed amount, then the next batch processing appointment is shifted right (at 607) followed by the current batch processing appointment (at 604), and everyone waits for the new start time (at 610).

Still referring to FIG. 6A, if the next batch processing appointment cannot shift right (at 606), then the MSA 515 checks to see whether the unready participant 134 is "locked" (at 608). The unready participant's appointment may be locked because it is on its final transport to the processing tool 117, or because it is loading onto the processing tool 117. If the unready participant 134 is not locked, then it is canceled (at 609) from the batch 500 and, if the start time has arrived, processing begins (at 412, in FIG. 4). More technically, each participant 134 is scheduled for a lot processing appointment within the batch processing appointment, and the lot processing appointment for the unready participant 134 is canceled. This effectively cancels the unready participant 134 from the batch 500.

Figure 6B:
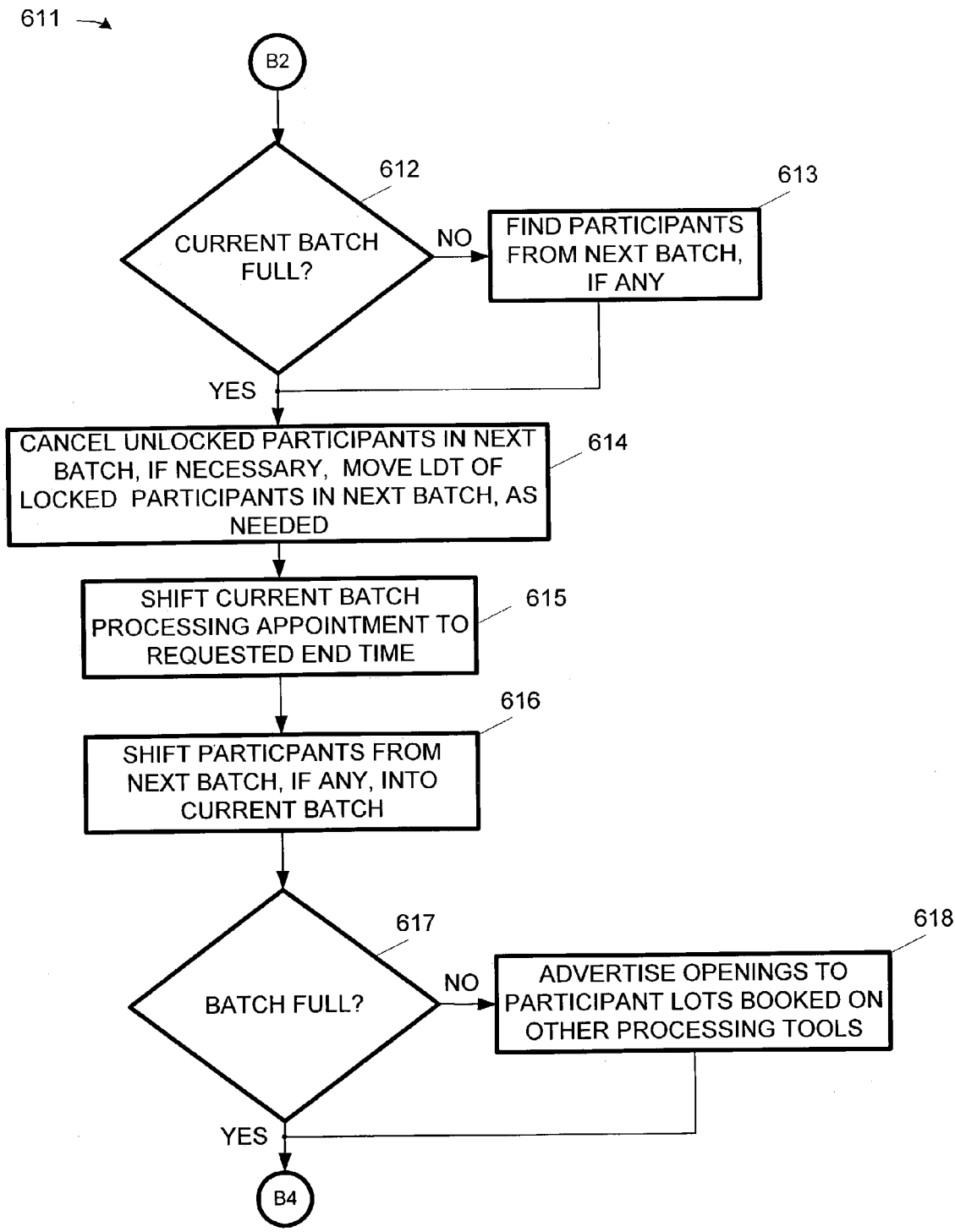

If the unready participant 134 is already locked, e.g., for final transport, then the MSA 515 follows the path 611 in FIG. 6B. In some circumstances in the illustrated embodiment, even locked appointments can be manipulated by canceling or shifting them. In the path 611, the MSA 515 forces the current batch lot processing appointment to shift later in time even though the unready participant 134 is already locked. If the current batch 500 is not full (at 612), the MSA 515 first looks (at 613) for participants 522 in the next batch 520 that can and will join the current batch 500 with the requested start time. These participants are removed from the next batch in preparation for joining the current batch after it is delayed.

The MSA 515 then (at 614) may (1) unlock the remaining locked participants 522 in the next batch and shifts their start times and LDTs (if required), or (2) cancel the remaining unlocked participants 522 from the next batch 520 (if needed) to effect the shift of the next batch 520. Some unlocked participants 522 in the next batch 520 may be able to shift without exceeding their LDT and these lots are not canceled. The MSA 515 then shifts (at 615) the current batch processing appointment later in time to end at the requested end time. The participants 522 located (at 613) from the next batch 520, if any, are then shifted to an earlier start time (at 616) and joined into the current batch 500. If the current batch 500 is still not full (at 617), the MSA 515 advertises (at 618) the openings to other participants 536 that may be booked on other machines. The MSA 515 then waits (at 610, FIG. 6A) for the new start time of the shifted, current, batch processing appointment.

Returning to FIG. 6A, as previously mentioned, the path 600 is triggered by the receipt (at 418, in FIG. 4) of a request to shift the batch processing appointment right, or later in time, by one or more of the participants 134 that is not ready. If the requested end time is later than or equal to the LDT of any participant 134 in the batch 500 other than the one requesting the shift (at 633), the MSA 515 follows the path 621 in FIG. 6C. Also as was previously mentioned, the decision making process is influenced by the "costs" incurred for taking a particular action. Accurate knowledge of the costs incurred at the time a proposed action is taken is therefore important in making the correct decision. Thus, the MSA 515 examines the cost implications of adding lots to the current batch 500 upon shifting the current batch processing appointment to the requested start time, or canceling the requesting lot from the current batch 500 and retaining the current batch start time.

Figure 6C:
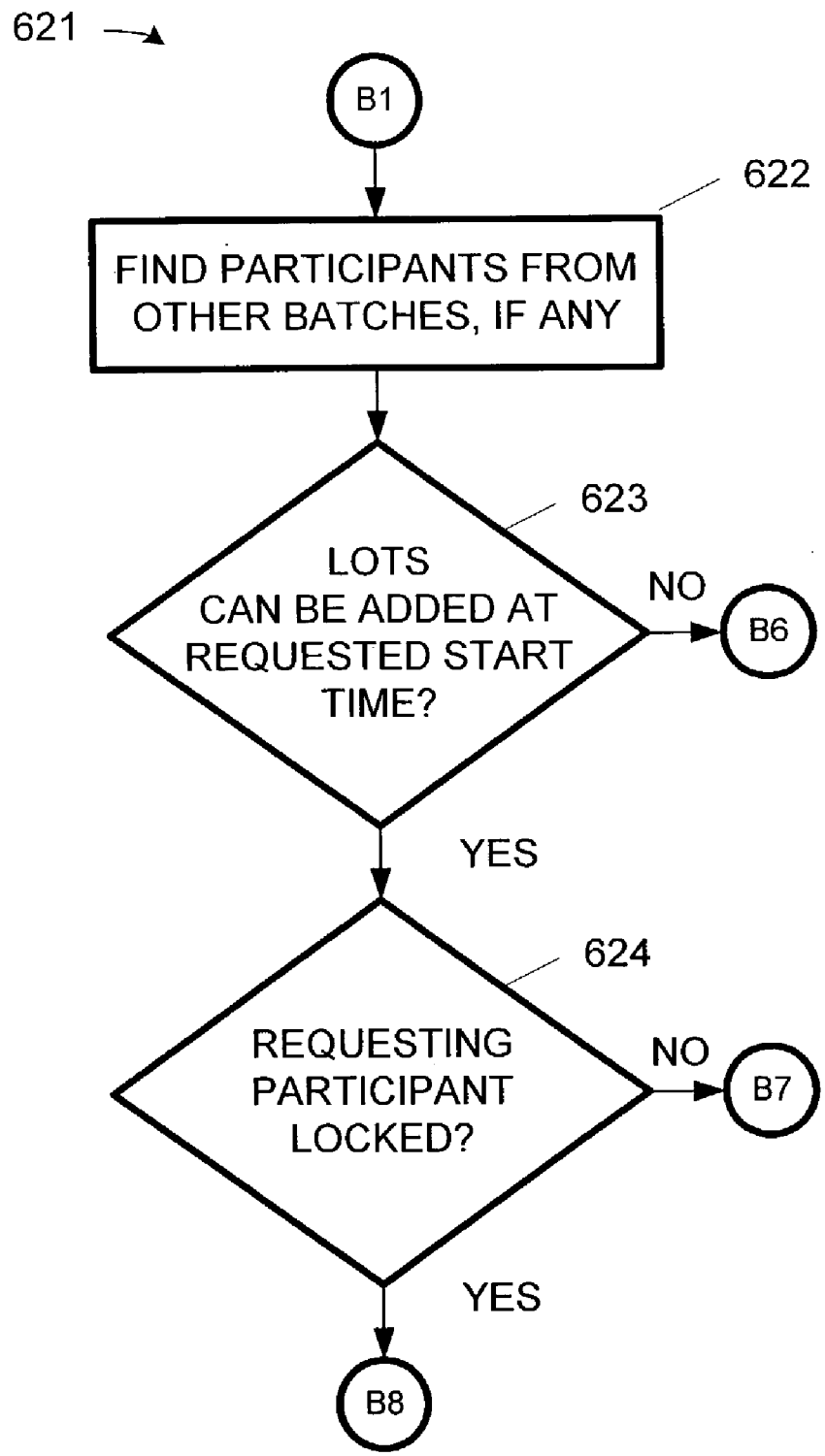

Accordingly, as shown in FIG. 6C, the MSA 515 first looks (at 622) for participants 522 in the next batch 520 and participants 536 in batches 534 on other process tools 532 that can join the current batch 500 with the requested start time. If no participants 522, 536 in other batches 520, 534 are found (at 623), then the MSA 515 follows the path 627 in FIG. 6D. If participants 522, 536 in other batches 520, 534 are found (at 623) and the requesting participant 134 is locked (at 624), then the MSA 515 follows the path 641 in FIG. 6E. Otherwise, the MSA 615 follows the path 650 in FIG. 6F. Each of these three possible scenarios will be discussed in turn.

Figure 6D:
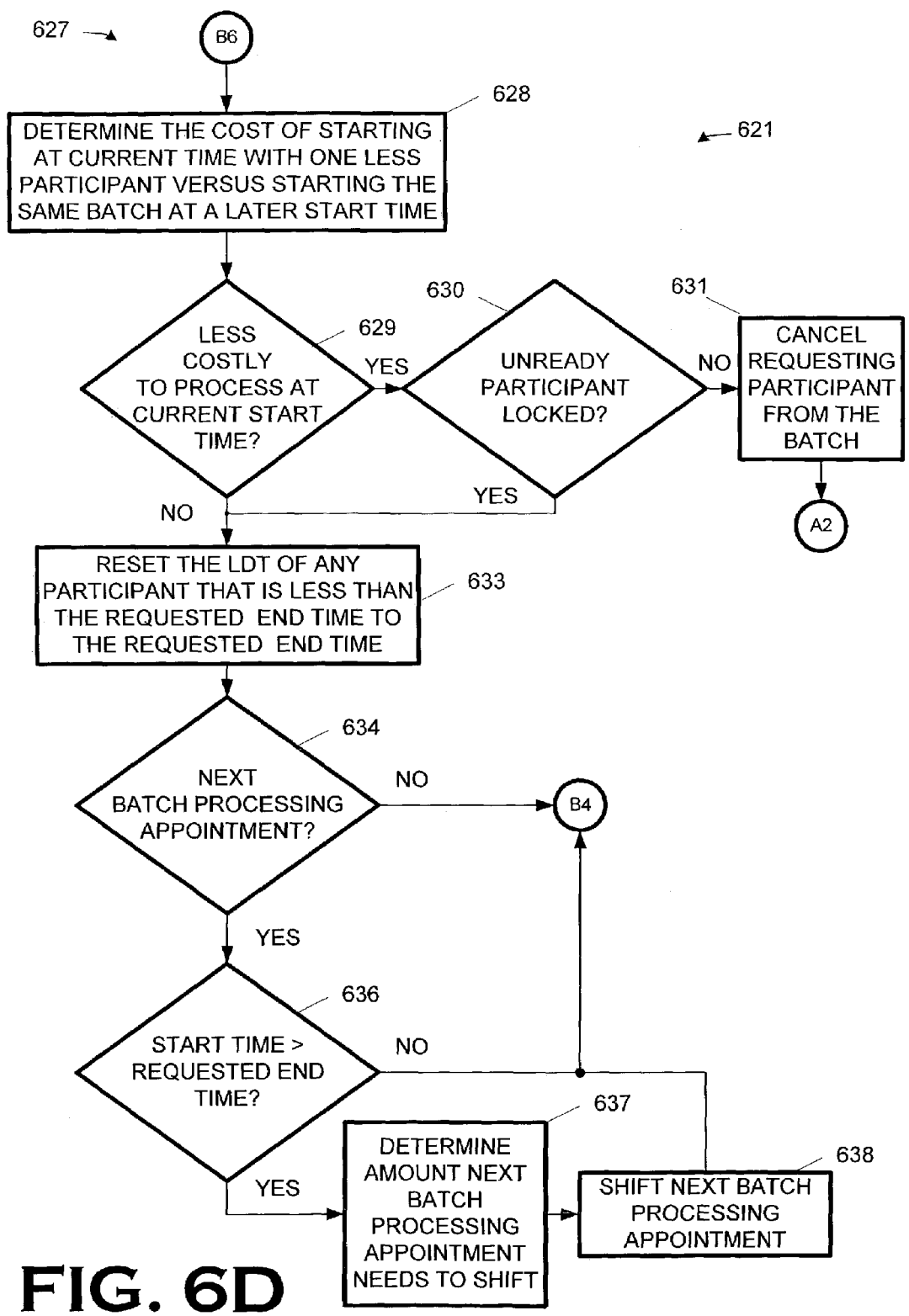

If no participants 522, 536 in other batches 520, 534 are found to be added (at 623, FIG. 6C), then the MSA 515 follows the path 627 in FIG. 6D. The MSA 515 first determines (at 628) the cost of starting the batch 500 at the current start time with one less participant 134 (i.e., the unready participant 134) versus the cost of starting at the requested start time with the same batch 500. Note that the current batch may not be full, but the number of participants stays the same. If it is less costly to start at the current start time (at 629), the MSA 515 checks to see if the unready participant 134 is locked (at 630). "Locked," in this context, means that the unready participant 134 is either on final transport to the processing tool 117 or is loading onto the processing tool 117. If the unready participant 134 is locked, then the MSA 515 proceeds as if it were less costly to start later with the same batch (at 629). If it is less costly to start at the current start time and the unready participant 134 is not locked, it is canceled from the batch 500 (at 631) and, if the start time has arrived, processing begins (at 412, FIG. 4).

If it is less costly to process later with the same batch 500 (at 629), or if the unready participant 134 is locked (at 630), then the MSA 515 resets the LDT of any participant 134 that is less than the requested end time to the requested end time (at 633). This also effectively changes the LDT for the batch 500 as a whole to the requested end time. The MSA 515 checks (at 634) to see if there is a "next" batch processing appointment for the processing tool 117 after the current batch processing appointment. If not, the MSA 515 shifts the current batch processing appointment later in time to the requested end time (at 604, FIG. 6A) and waits for the new start time (at 610, FIG. 6A).

If there is a next batch processing appointment (at 634), the MSA 515 determines (at 636) whether the start time of the next batch processing appointment is earlier than the requested end time. If not, the MSA 515 shifts the current batch processing appointment right to the requested end time (at 604, FIG. 6A) and waits for the new start time (at 610, FIG. 6A). If the start time of the next batch processing appointment is earlier than the requested end time of the current batch, then the MSA 515 determines (at 637) how much time to shift the next batch processing appointment, shifts (at 638) the next batch processing appointment later in time by that amount, shifts the current batch processing appointment to the requested end time (at 604, FIG. 6A), and waits for the new start time (at 610, FIG. 6A). Note that, in the course of shifting the next batch processing appointment, the MSA 515 unlocks and shifts LDTs of locked participants or cancels unlocked participants 134 in the next batch as was described above (at 614, in FIG. 6B).

Figure 6E:
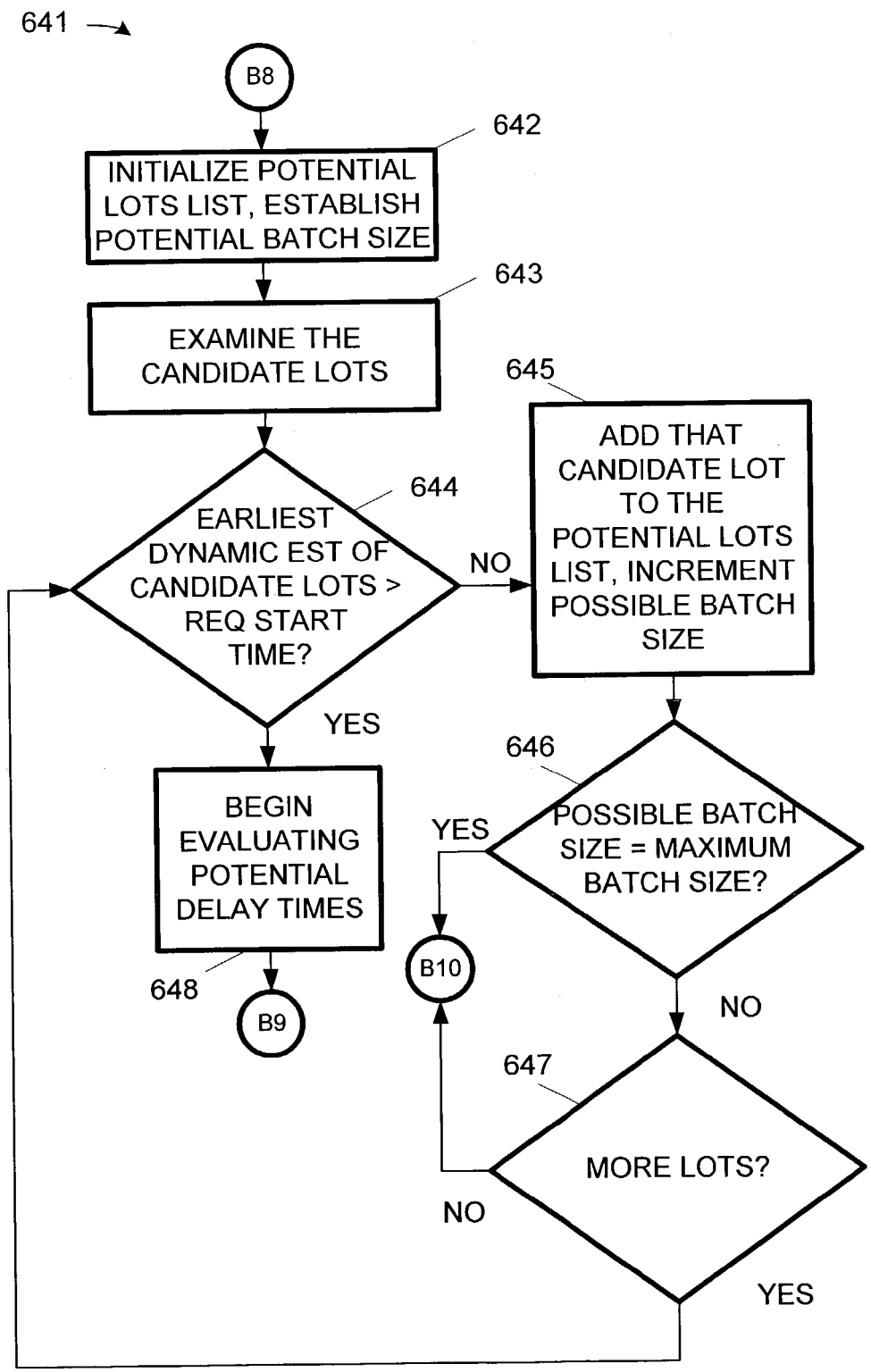

Returning to FIG. 6C, if (at 623) participants 522, 536 in other batches 520, 534 can be added if the batch processing appointment is shifted to the requested end time, and the requesting participant is locked (at 624), the MSA 515 follows the path 641 in FIG. 6E. The MSA 515 has previously identified (at 622, in FIG. 6C) lots that could join the current batch 500 if the current batch processing appointment is shifted to the requested end time. In addition to the participants 522, 536 in other batches 520, 534, these may include non-participants 132. It also includes the unready participant 134 requesting the shift.

The MSA 515 keeps the identities of these lots that may be added in a "candidate lot list," so-called because each of the lots on the list is a candidate to participate in the current batch 500 should it be delayed. If, at some point in the decision-making process the MSA 515 determines a candidate lot should be added to the current batch 500, the MSA 515 removes the candidate lot from the candidate lots list and puts it onto a "potential lots list," so-called because the lots are potential members of the batch 500 pending only the actual mechanics of removing them from their batches 520, 534 and joining them to the current batch 500.

Each of the candidate lots and potential lots has a "dynamic earliest start time," or "dynamic EST," associated with it that represents the earliest time at which the lot can start an appointment. The value of the dynamic EST is dynamically calculated based on the current time, the start time for the next transport, transport time remaining for the lot to reach its destination, loading start time, and remaining loading time. It is called "dynamic" because it changes over time as these factors change. The dynamic EST is used, as will be discussed more fully below, in adding candidate lots and potential lots to the current batch 500 as will be discussed further below.

Returning to FIG. 6E, the MSA 515 initializes the potential lots list and establishes a "potential batch size" (at 642), that is initialized at the actual size of the current batch 500. Note that the current batch 500 includes the unready participant 134 that is requesting the shift. The MSA 515 then begins examining (at 643) the previously identified (at 622, in FIG. 6C) lots on the candidate lots list in ascending order of their dynamic EST. For each of the previously identified candidate lots, the MSA 515 determines (at 644) whether the dynamic EST is greater than the requested start time. If not, the MSA 515 adds (at 645) the candidate lot to a "potential lots" list. The MSA 515 then increments the possible batch size (at 645). The MSA-515 continues until either the possible batch size equals the maximum batch size (at 646) or there are no more candidate lots (at 647). If the possible batch size finally equals the maximum batch size (at 646), or if the MSA 515 runs out of candidate lots to add to the current batch 500 (at 647), then the current batch 500 should be delayed to the requested start time. The MSA 515 then proceeds to delay the current batch 500 (at 680, FIG. 6H), which will be discussed further below.

On the other hand, if the current batch 500 is not full, and the candidate lot list is not empty, the MSA 515 begins evaluating potential delay times (at 648). To evaluate the potential delay times (at 648), the MSA 515 follows the path 652 in FIG. 6G, and begins by establishing (at 653) a baseline for the cost determinations on which the evaluations are made. In the illustrated embodiment, the potential lot list (plus the current batch 500) serves as a "baseline batch," its batch size is the "baseline batch size," and the requested start time is the baseline start time for subsequent cost determinations. At this point, the MSA 515 temporarily considers the "best" cost for delay to be zero and the "best" batch size to be the baseline batch size. The MSA 515 maintains yet another list whose content is being considered for membership in the current batch 500 should it be delayed. This second list will be called, for present purposes, the "best lots list." The "best lots list," is initiated, and set to the potential lots list. That is, the best lots list is loaded with the content of the potential lots list.

The MSA 515 then removes the lot with the earliest EST from the candidate lots list and adds it to the potential lots list, and increments the possible batch size (at 654). The MSA 515 determines the cost of starting the current batch 500 at the requested start time with the baseline batch size (at 655). The MSA 515 then determines the cost of starting the current batch 500 at the time of the dynamic EST of the just added candidate lot with the possible batch size (at 656). The MSA 515 then determines whether the cost at the requested start time is greater than the cost at the dynamic EST (at 657). If so, then the MSA 515 updates the best cost to the cost of starting at the dynamic EST (at 658), updates the best batch size to the possible batch size(at 659), and updates the best lots list to the possible lots list (at 660). The MSA 515 loops through this logic until there are no more candidate lots (at 661) or the possible batch size reaches the maximum batch size (at 662). At this point, the current batch 500 should be delayed to the start time associated with the lot whose dynamic EST is associated with the "best" cost and with its membership defined by the "best" batch size and the "best" lot list, plus the other participants at the current batch 500. Thus, the MSA 515 sets the best lots list to the potential lots list (at 663). The MSA 515 then delays the current batch 500 (at 680, FIG. 6H), which will be discussed further below.

Figure 6F:
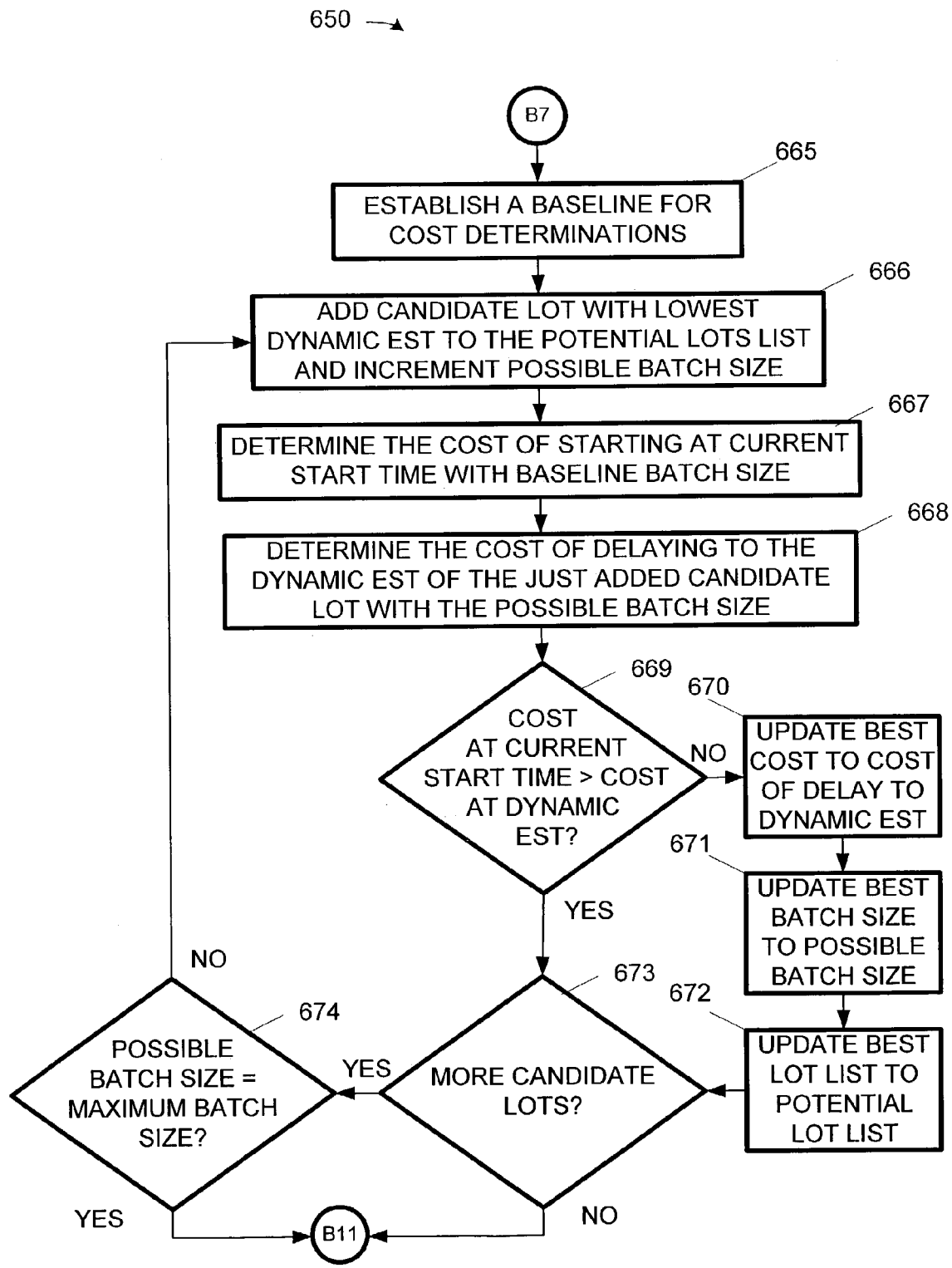

Returning now to FIG. 6C, if there are candidate lots to add (at 623) and the requesting participant-134 is not locked (at 624), then the MSA 515 follows the path 650 in FIG. 6F. Note that the unlocked participant requesting the right shift is on the candidate lot list. Referring now to FIG. 6F, the MSA 515 begins by first establishing (at 665) a baseline for subsequent cost determinations and evaluations. The baseline is set differently in this case, however, than as was discussed above. In this case, the baseline is established by setting the baseline batch size and the potential batch size to one less than the current batch size of the current batch 500, setting the best cost to zero, and the best lot list and the potential lot list to null. The MSA 515 then begins evaluating potential delay times compared to the current batch processing appointment's current start time.

The MSA 515 then moves the remaining candidate lot with lowest dynamic EST from the candidate lots list to the potential lots list, and increments the possible batch size (at 666). The MSA 515 determines the cost of starting the current batch 500 at the current start time with the baseline batch size (at 667). The MSA 515 then determines the cost of starting the current batch 500 at the time of the dynamic EST of the just added candidate lot with the possible batch size (at 668). The MSA 515 then determines whether the cost at the current start time is greater than the cost at the dynamic EST (at 669). If so, then the MSA 515 updates the best cost to the cost of starting at the dynamic EST (at 670), updates the best batch size to the possible batch size(at 671), and updates the best lots list to the possible lots list(at 672). The MSA 515 loops through this logic until there are no more candidate lots (at 673) or the possible batch size reaches the maximum batch size (at 674).

At this point, the MSA 515 examines the best lot list (at 677, in FIG. 6H) to see if it is null. If the best lot list is still null, the MSA 515 cancels the requesting lot (at 678) and the current batch 500 start time does not change. If not, then the MSA 515 delays (at 680) the current batch 500. To delay the batch (at (680), the MSA 515 calculates a new end time for the current batch processing appointment (at 681) by finding the maximum, or latest, dynamic EST among all the ESTs for the lots on the best lot list. The MSA 515 adds this maximum dynamic EST to the duration of the current batch processing appointment to calculate the new end time of the current batch. If any of the best lots are potential lots from the next batch 520, the MSA 515 removes them (at 682) from the next batch 520. (If this empties the next batch 520, then the MSA 515 cancels the empty batch 520 and its batch processing appointment.)

The MSA 515 (at 683) then reviews the LDTs of the best lots and resets any LDT less than, or earlier, than the calculated end time to the calculated end time. Note that this effectively resets the LDT for the current batch 500, also.

The MSA 515 then determines (at 684) if the calculated end time is less than the start time of the next batch processing appointment. If so, or if there is no next batch processing appointment, the MSA 515 (at 685) constitutes the new batch 500 at the new time. The MSA 515 does this by shifting the current batch appointment 500 to the calculated end time, shifting the start times for the potential lots to the new start time of the current batch, and joins the best lots removed from the next batch 520 into the current batch 500. If the start time for the next batch processing appointment is less than, or earlier, than the requested end time (at 684), then the MSA 515 shifts the next batch processing appointment later in time (at 686), and constitutes the new batch 500 at the new time (at 685) as was described above. In shifting the next batch processing appointment (at 686), the MSA 515 may have to unlock and shift LDTs of locked participants or cancel unlocked appointments in a manner discussed above. After the new batch is constituted at the new time (at 685), the MSA 515 checks the batch size and, if the batch is not full, advertises openings to other participants that may be booked on other machines. The MSA 515 then waits for bid requests responding to the advertisement and the arrival of the new start time.

Figure 7A:
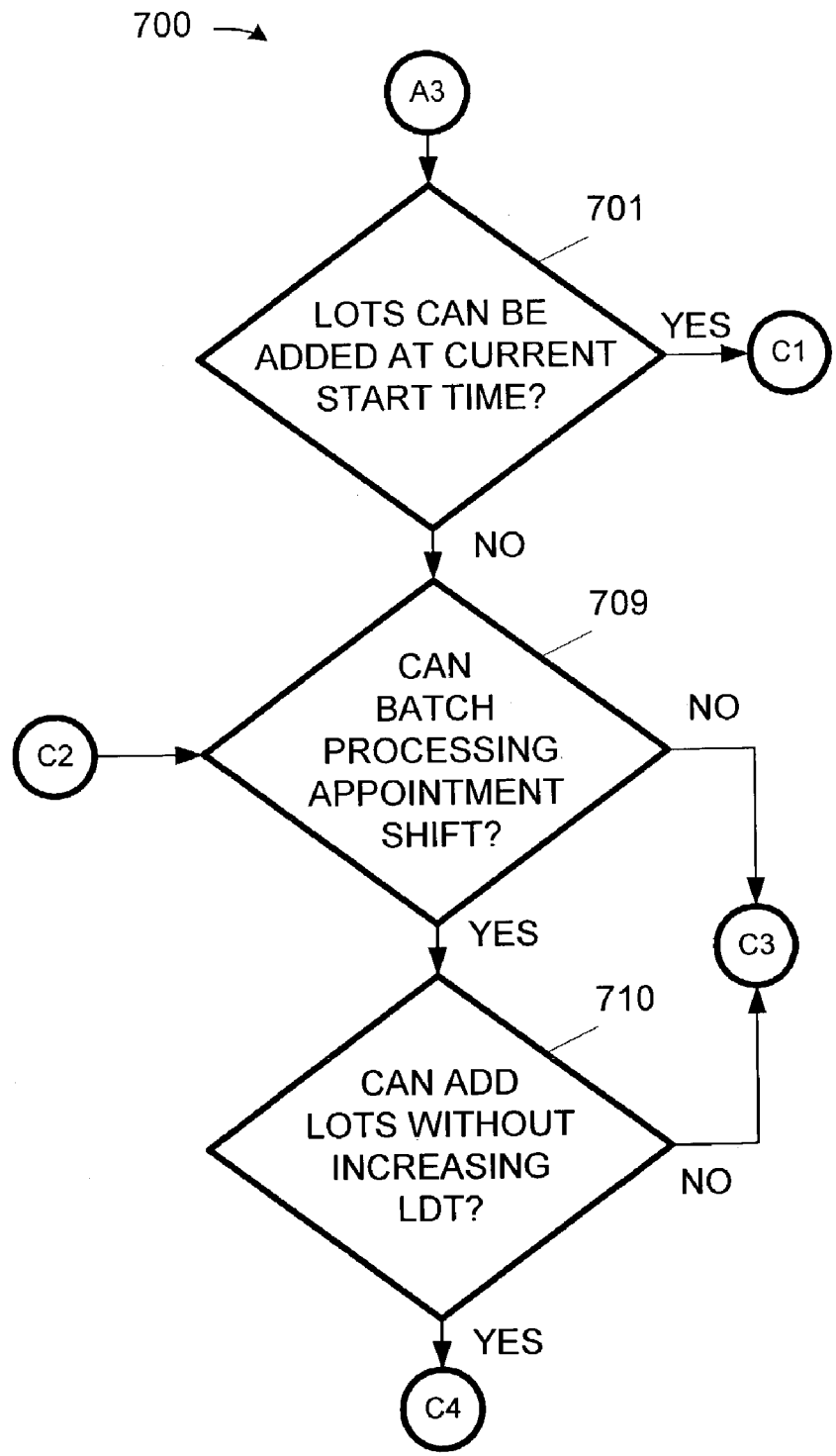
Figure 7B:
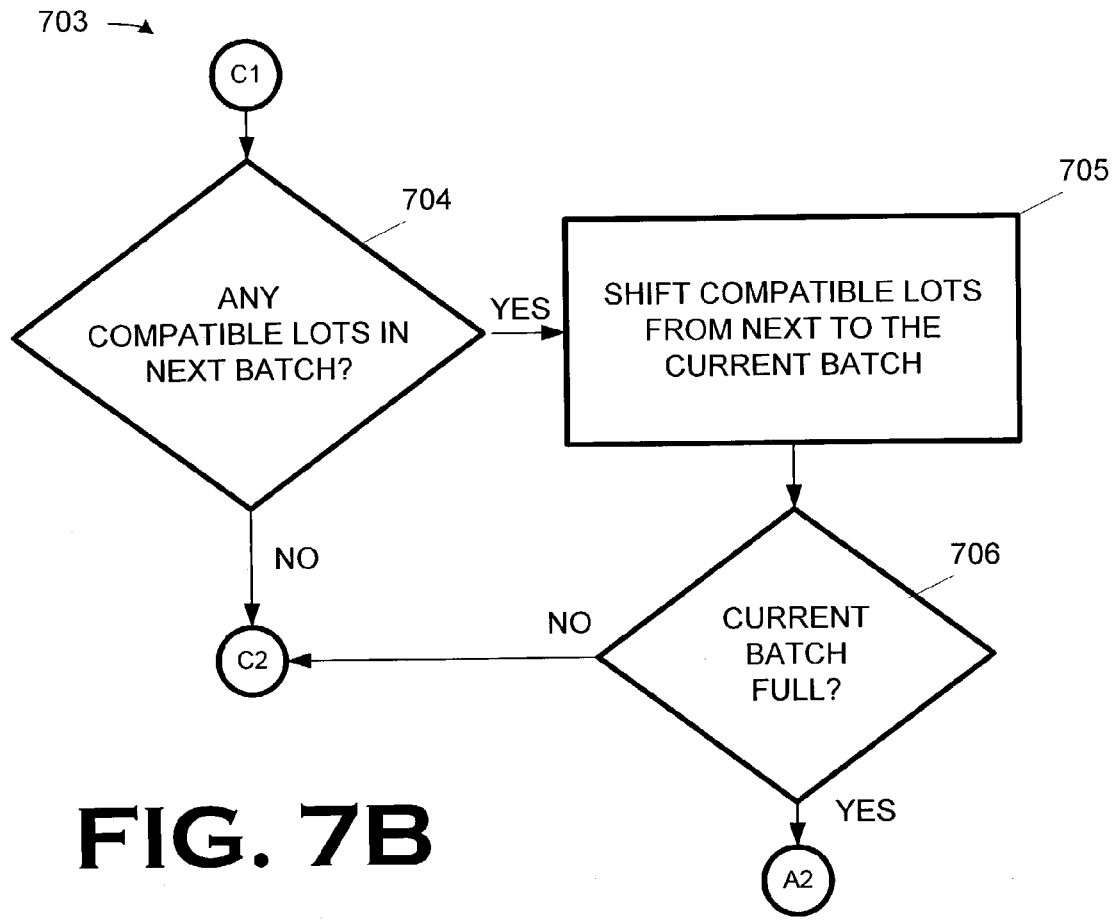

Returning now to FIG. 4, if the alarm fires (at 403) and the participants 134 are ready (at 406) but the batch is not full (at 409), the MSA 515 follows the path 700 in FIG. 7A. The MSA 515 first determines (at 701) if lots can be added, i.e., if new participants can be found, at the current start time. If so, then the MSA 515 follows the path 703 in FIG. 7B. The MSA 515 first looks to see (at 704) if there are any compatible participants 522 in the next batch 520 on the same process tool 117. In this context, "compatible" means not only can it meet the timing requirements, but it can be processed with the same recipe, including any ERF etc., as the current batch 500.

If compatible lots are found in the next batch 520, those participants 522 are removed from the next batch 520 and shifted and joined (at 705) into the current batch processing to appointment. More technically, a list of candidate lots drawn from the participants 522 in the next batch 520 are added one at a time until either the current batch 500 is full or the list of candidate lots is exhausted. If the current batch 500 is full (at 706), then the MSA 515 begins the current batch processing appointment at the current time (at 412, FIG. 4). If there is no "next" batch processing appointment (at 704), or if there are no compatible lots in the next batch appointment (at 704), or if the current batch 500 cannot be filled with compatible lots (at 706), then the MSA 515 returns to the path 700 in FIG. 7A (at 709).

Returning to FIG. 7A, the MSA 515 determines whether the current batch processing appointment can shift right, or later in time (at 709), and whether new participants 134 can be proceeds to the path 725 in FIG. 7D. If not, if the current batch processing appointment cannot shift right (at 709) or lots cannot be added without increasing the batch LDT (at 710), then the MSA 515 proceeds to the path 711 in FIG. 7G.

Figure 7C:
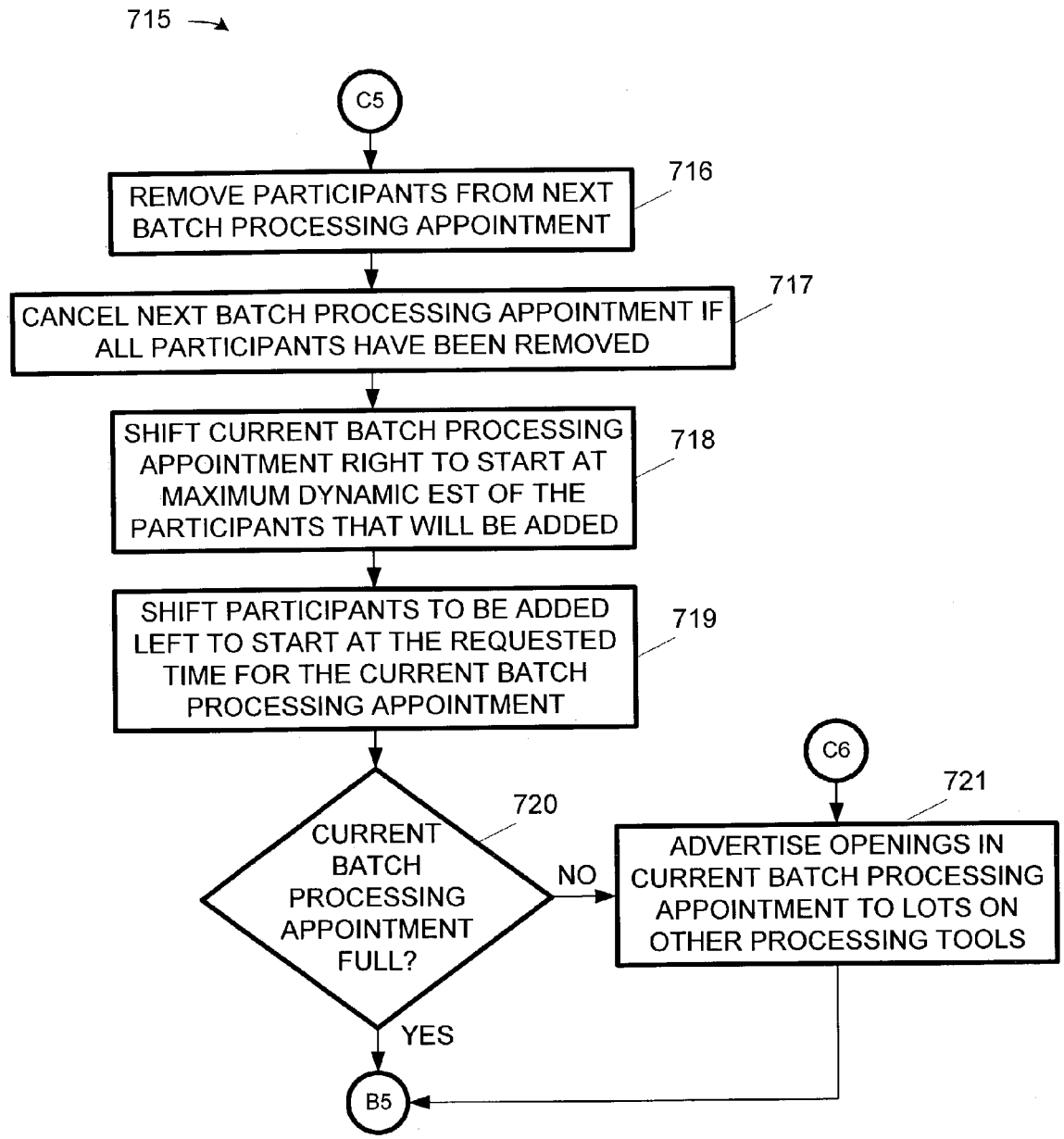
Figure 7D:
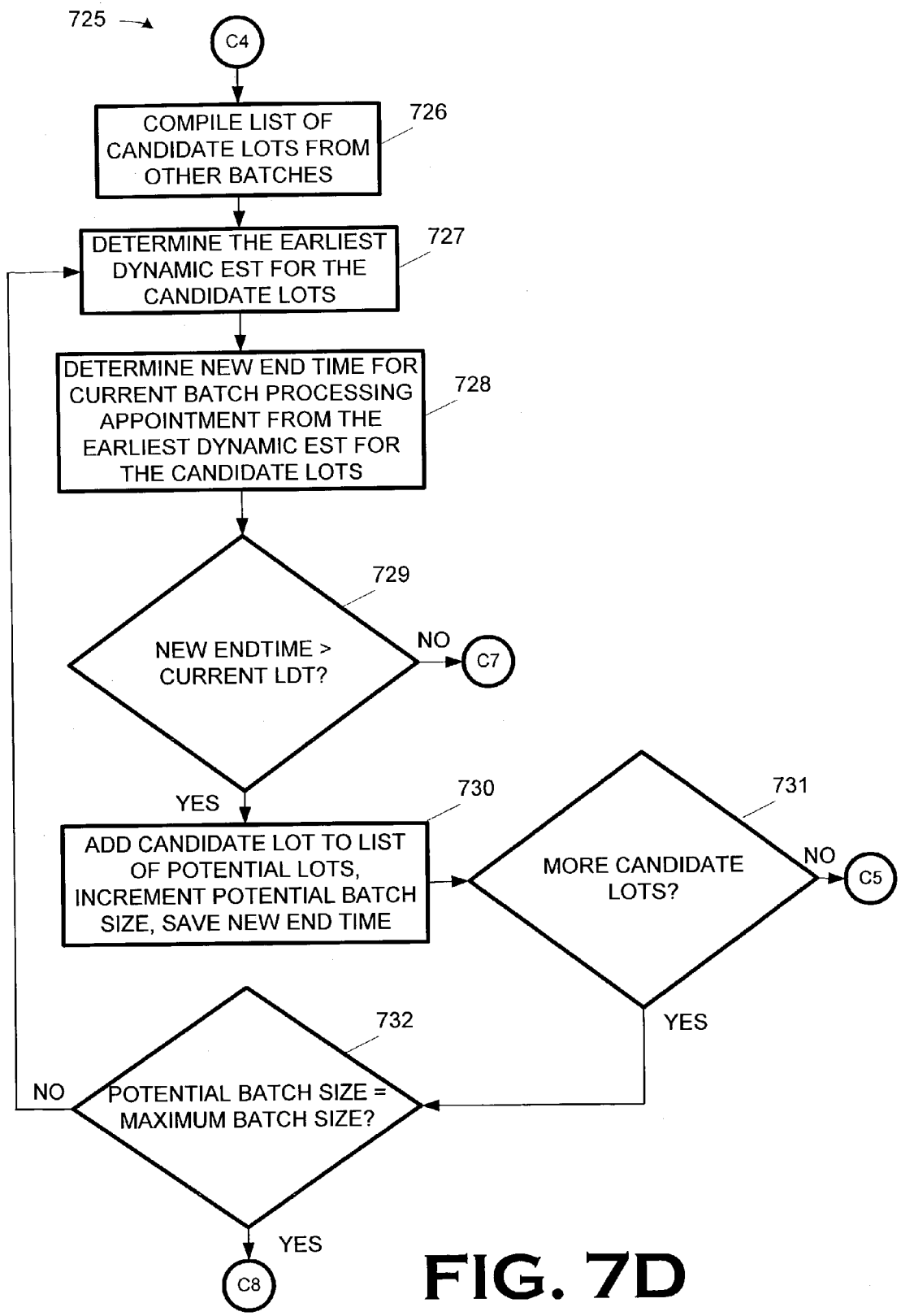

Referring now to FIG. 7D, if the current batch processing appointment can shift later in time (at 709, FIG. 7A) and lots can be added without increasing the batch LDT (at 710, FIG. 7A), the MSA 515 follows the path 725. The MSA 515 compiles (at 726) a list of candidate lots 134 in other batches 520, 534. In the illustrated embodiment, this includes not only other batches 520 on the processing tool 117, but also in other batches 534 on other processing tools 532. The MSA 515 then determines (at 727) the earliest dynamic EST for the candidate lots and determines (at 728) a new end time for the current batch processing appointment if the start time is shifted to this earliest dynamic EST. Note that the dynamic EST of participants 522 remaining in the next batch 520 will be greater than the current start time of the current batch processing appointment. Otherwise, the MSA 515 would be on the path 703 in FIG. 7B.

Still referring to FIG. 7D, if the new end time, is less than or equal to the current LDT of the current batch 500 (at 729), the MSA 515 (at 730) adds the candidate lot to a list of potential lots, increments the potential batch size, and saves the new end time. If the there are more candidate lots (at 731) and if the potential batch size is less than the maximum batch size (at 732), the MSA 515 again (at 727) determines the earliest dynamic EST for the candidate lots. The MSA 515 loops through this process until either it runs out of candidate lots (at 731) or the potential batch size equals the maximum batch size (at 732) (i.e., the current batch 500 can be filled without extending the batch LDT). If the MSA runs out of candidate lots (at 731), the MSA 514 proceeds to the path 715 in FIG. 7C.

On the path 715 in FIG. 7C, if all the participants from the next batch can be added, the MSA 515 removes the participants 522 to be added from the next batch 520 (at 716) and cancels the next batch processing appointment (at 717). The MSA 515 then shifts the current batch processing appointment (at 718) right, or later in time, to start at the maximum dynamic EST of the participants 522 to be added. The MSA 515 then shifts (at 719) the participants 522 to be added left, or earlier in time, to start at the new time for the current batch processing appointment. If the current batch processing appointment is not yet full (at 720), the MSA 515 advertises the openings to lots 536 on other processing tools 532 (at 721). Either way, the MSA 515 then waits for bid requests responding to the advertisement and the arrival of the new start time (at 610, in FIG. 6A).

Figure 7E:
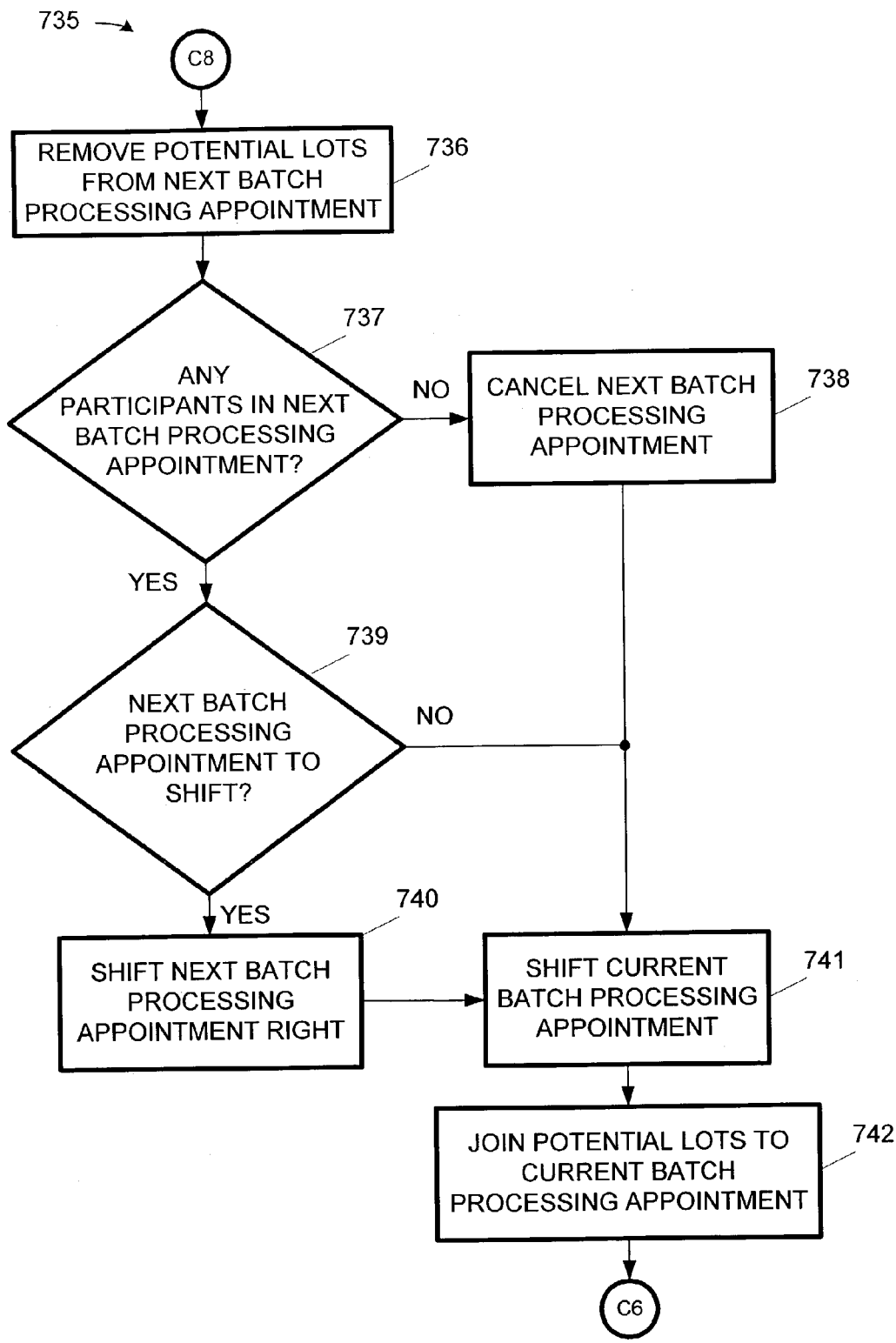
Figure 7F:
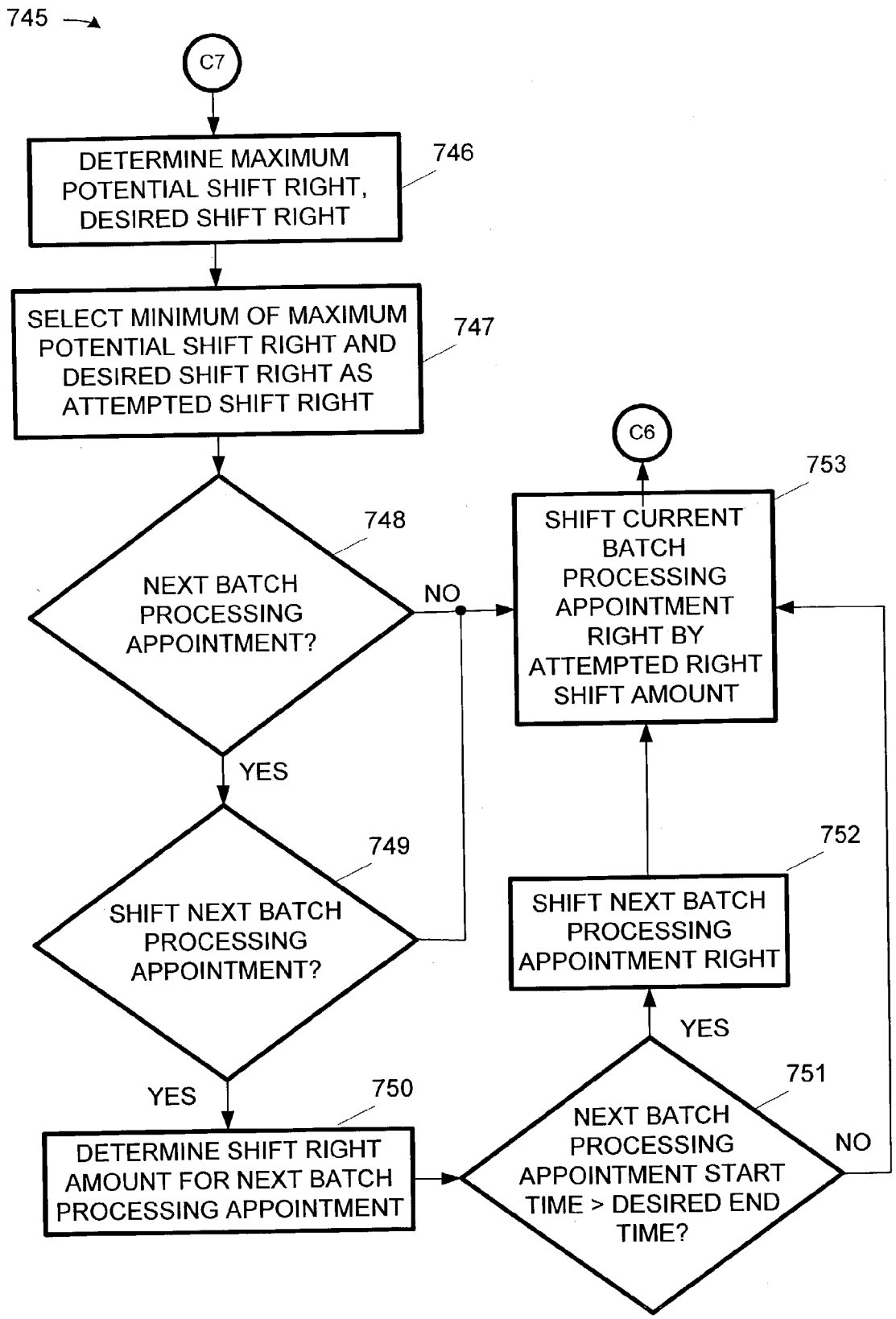

Returning to FIG. 7D, if (at 732) the current batch 500 can be filled but with less than all the participants 522 of the next batch 520, the MSA 515 proceeds on the path 735 in FIG. 7E. The MSA 515 begins by (at 736) initiating the removal of the potential lots from the next batch processing appointment. In some cases, circumstance may have changed such that the next batch processing appointment is now, in fact, empty (at 737). If so, the next batch processing appointment is canceled (at 738). Otherwise, the MSA 515 determines (at 739) whether the next batch processing appointment 500 needs to be shifted right, or later in time. If so, the MSA 515 shifts (at 740) the next batch processing appointment. In the illustrated embodiment, this shift includes, if necessary, canceling unlocked participants 522 and/or extending the LDT of locked participants 522 of the next batch 520.

The MSA 515 then shifts (at 741) the current batch processing appointment right, or later in time, once the next batch processing appointment has been dealt with. More particularly, the MSA 515 shifts the current batch processing appointment to the new end time calculated by adding the appointment duration to the maximum dynamic EST of the lots to be added. This also involves shifting the individual processing appointments for the participants 134 accordingly. The MSA 515 then joins (at 742) the potential lots previously removed (at 736) from the next batch 520 to the shifted, current batch 500. This involves shifting the processing appointments for the potential lots left, or earlier in time. If the current-batch 500 is still not full (at 720, FIG. 7C), the MSA 515 advertises the openings (at 721, FIG. 7C) and then waits for bid requests responding to the advertisement and the arrival of the new start time (at 610, FIG. 6A).

Returning once again to FIG. 7D, if the MSA 515 encounters (at 729) a new end time less than the current LDT of the current batch processing appointment, then it may be possible to shift the current batch processing appointment without increasing the LDT. The MSA 515 proceeds to the path 745 in FIG. 7F. The MSA 515 determines (at 746) the maximum potential shift right and the desired shift right. The maximum potential shift is the difference between the batch LDT and the bath appointment end time. The desired right shift is determined by multiplying a configurable property (e.g., a batch delay factor) by the batch appointment duration. The MSA 515 then selects (at 747) the minimum of the maximum potential shift right and the desired shift right, which is then designated the "attempted shift right."

If there is a next batch processing appointment (at 748), the MSA 515 determines (at 749) whether to shift the next batch processing appointment and (at 750) the amount to shift. In the illustrated embodiment, the desired end time for the current batch processing appointment is the current end time shifted by the previously determined (at 747) attempted shift right amount. If (at 751) the start time of the next batch processing appointment is less, or earlier than the desired end time of the current batch and the next batch can shift, the MSA 515 attempts to shift (at 752) the next batch processing appointment later in time to accommodate the shift for the current batch processing appointment. Once the next batch processing appointment has been shifted (at 752), or if there is no "next" batch processing appointment (at 748), or if the next batch processing appointment does not need to shift (at 749), then the MSA 515 shifts (at 753) the current batch processing appointment by the attempted right shift amount previously determined (at 747). Since the current batch processing appointment is not full, the MSA 515 advertises the openings (at 721, FIG. 7C) and then waits (at 610, FIG. 6A) for bid requests responding to the advertisement and the arrival of the new start time.

Figure 7G:
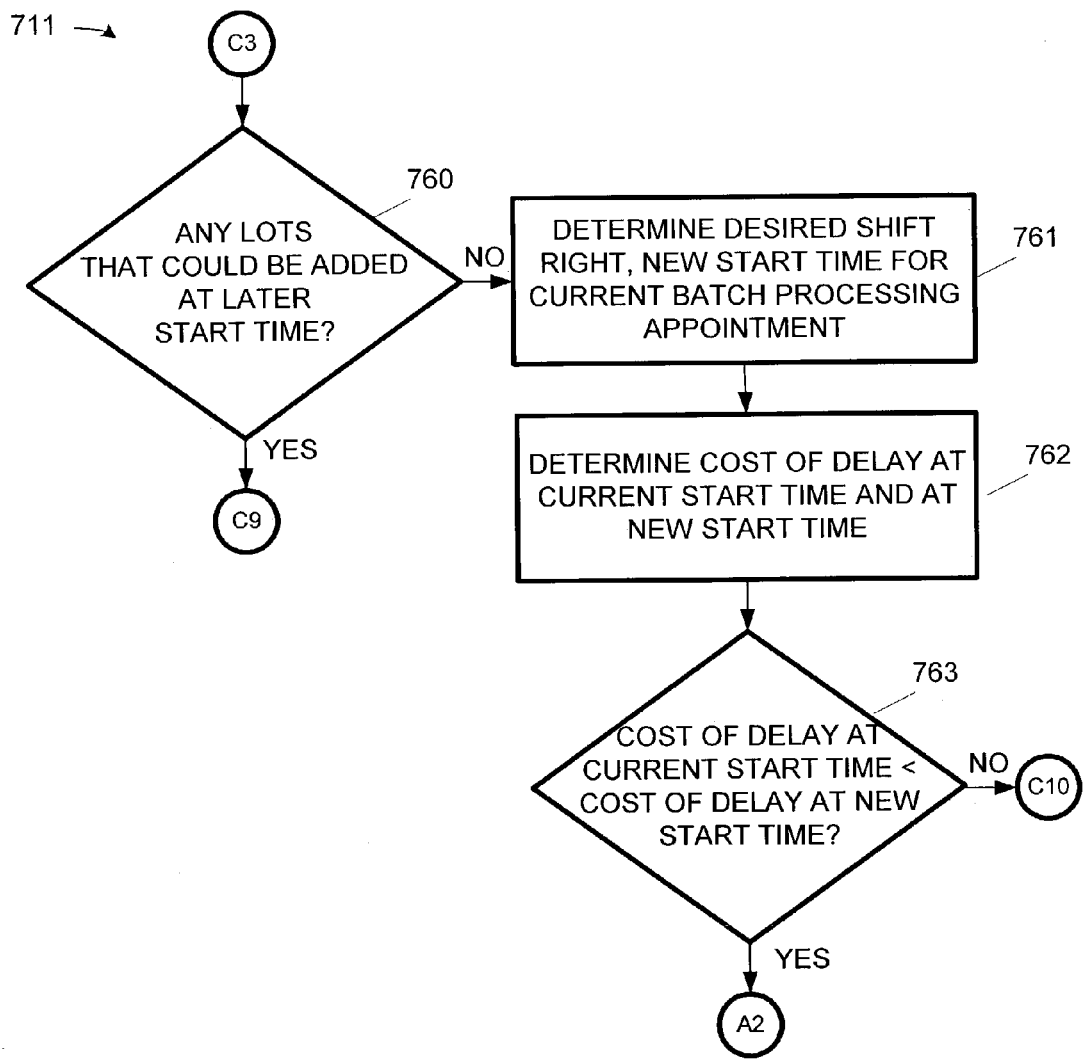
Figure 7H:
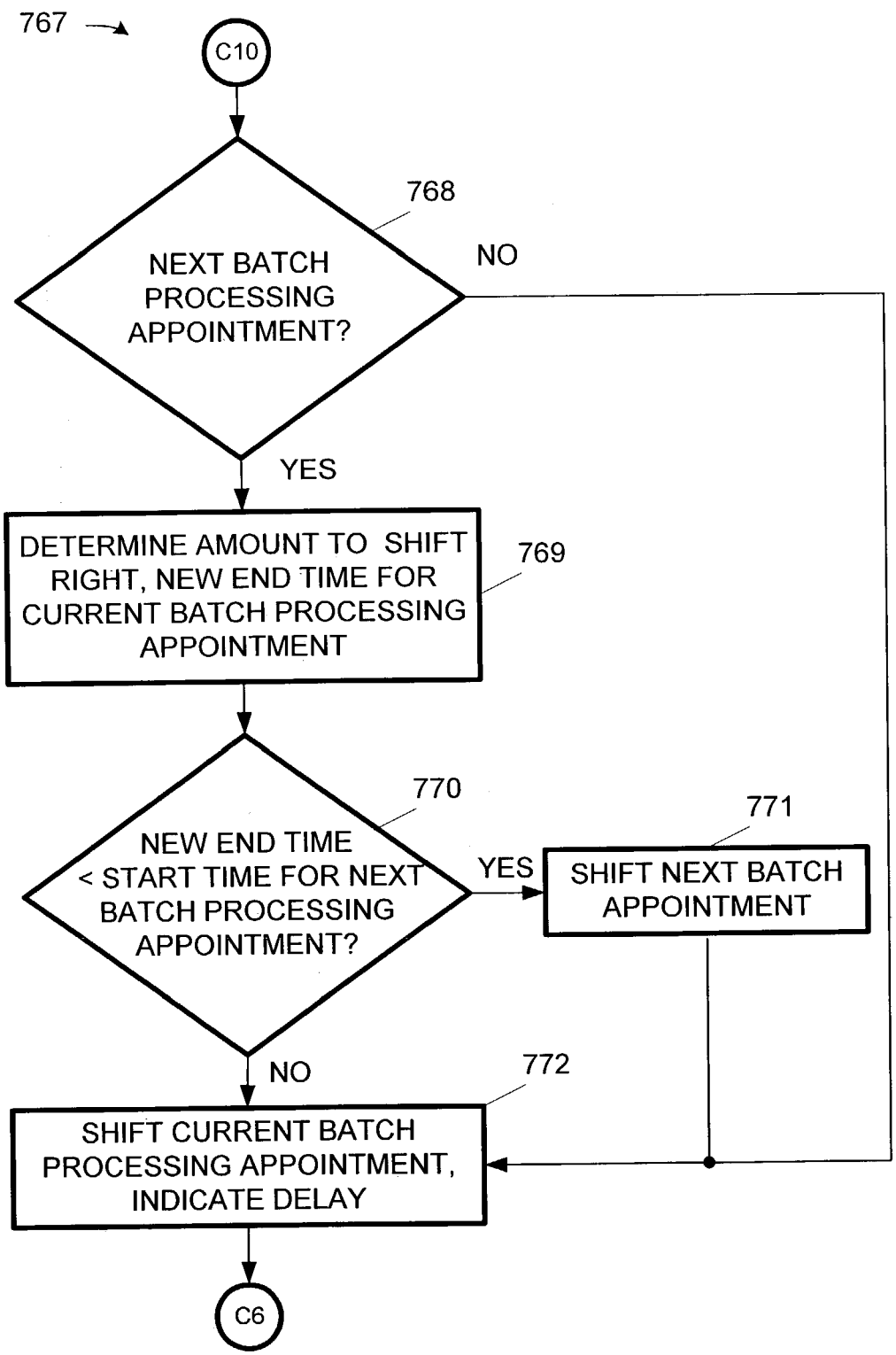
Figure 71:
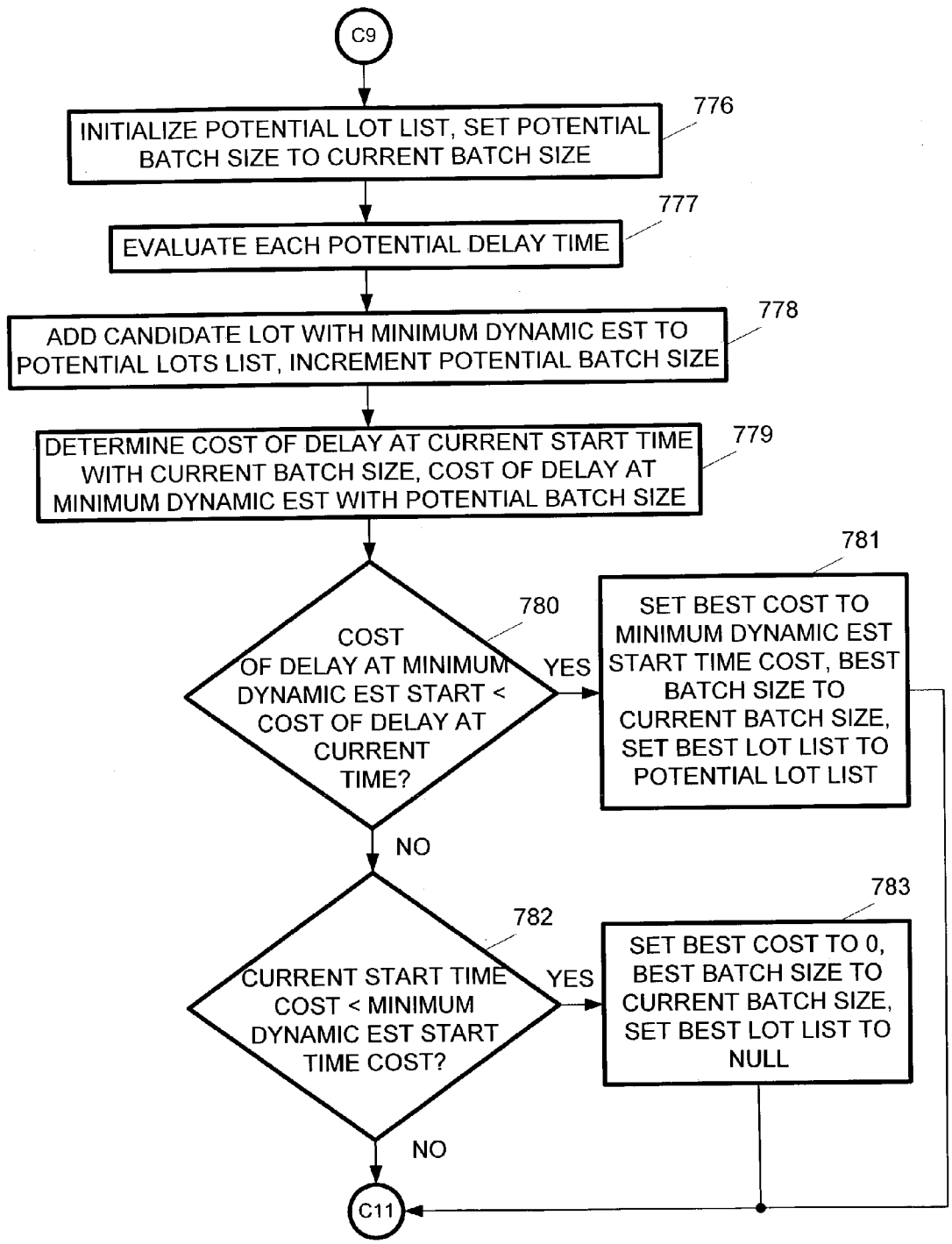

Returning once again to FIG. 7A, if the current batch processing appointment cannot shift right (at 709) or cannot be filled without increasing its LDT (at 710), the MSA 515 proceeds on the path 711 in FIG. 7G. The MSA 515 determines (at 760) whether there are any potential lots that can be added to the current batch 500. If not, the MSA 515 determines (at 761) a desired shift right to a new start time for the current batch processing appointment. The desired shift right is determined, in the illustrated embodiment, by multiplying a configurable property value (e.g., a batch delay factor) by the batch appointment duration. The MSA 515 then determines (at 762) the cost of delay at the current start time and at the new start time for the same batch 500 of participants 134. The actual cost of delay at each time is determined in a manner more fully described below and in accordance with the present invention.

If the cost of delay at the current time is less than the cost of delay at the new start time (at 763), then the batch 500 begins processing (at 412, FIG. 4). Otherwise, the MSA 515 follows the path 767 in FIG. 7H. If there is a next batch processing appointment (at 768), the MSA 515 determines (at 769) the amount to shift it and a new end time for the current batch processing appointment. If (at 770) the new end time is less that new start time for the next batch processing appointment, the MSA 515 shifts (at 771) the next batch appointment right. In the illustrated embodiment, this may include canceling unlocked participants and/or increasing the LDT of locked participants. If not (at 770), or if there is no batch processing appointment (at 768), or once the next batch processing appointment has been shifted (at 771), the MSA 515 shifts (at 772) the current batch processing appointment right, or later in time. The MSA 515 and current batch 500 then wait for the new start time (at 610, FIG. 6A).

Returning to FIG. 7G, if there are lots that can be added (at 760), then the MSA 515 follows the path 775 in FIG. 7I. At this point, the current batch 500 is not full and needs to shift right beyond its LDT or past a blocking appointment to add more lots. The MSA 515 has determined that there is at least one lot 522, 536 that can be added at a later start time.

The list of candidate lots previously compiled may include not only compatible lots 522 in the next batch processing appointment on the current processing tool 117, but also compatible lots 536 on other processing tools 532.

The MSA 515 initializes (at 776) a potential lots list to null and sets (at 776) a potential batch size to the current batch size. The MSA 515 then evaluates (at 777) each potential delay time, as will be discussed further below. The MSA 5.15 then adds (at 778) the candidate lot with the minimum, or earliest, dynamic EST to the potential lots: list and increments the potential batch size. The MSA 515 then determines (at 779) the cost of delay at the current start time with the current batch size and the cost of delay at the minimum dynamic EST with the potential batch size. If (at 780) the cost of delay to the minimum dynamic EST is less than the cost of delay at the current start time, the MSA 515 (at 781) sets the best cost to the cost of delay at the minimum dynamic EST, the best batch size to the current batch size plus one, and the best lots list to the potential lots list. If (at 782) the cost of delay at the current start time is less than the cost of delay to the minimum dynamic EST, then the MSA 515 (at 783) sets the best cost to 0, the best batch size to the current batch size, and the best lot list to null.

Figure 7J:
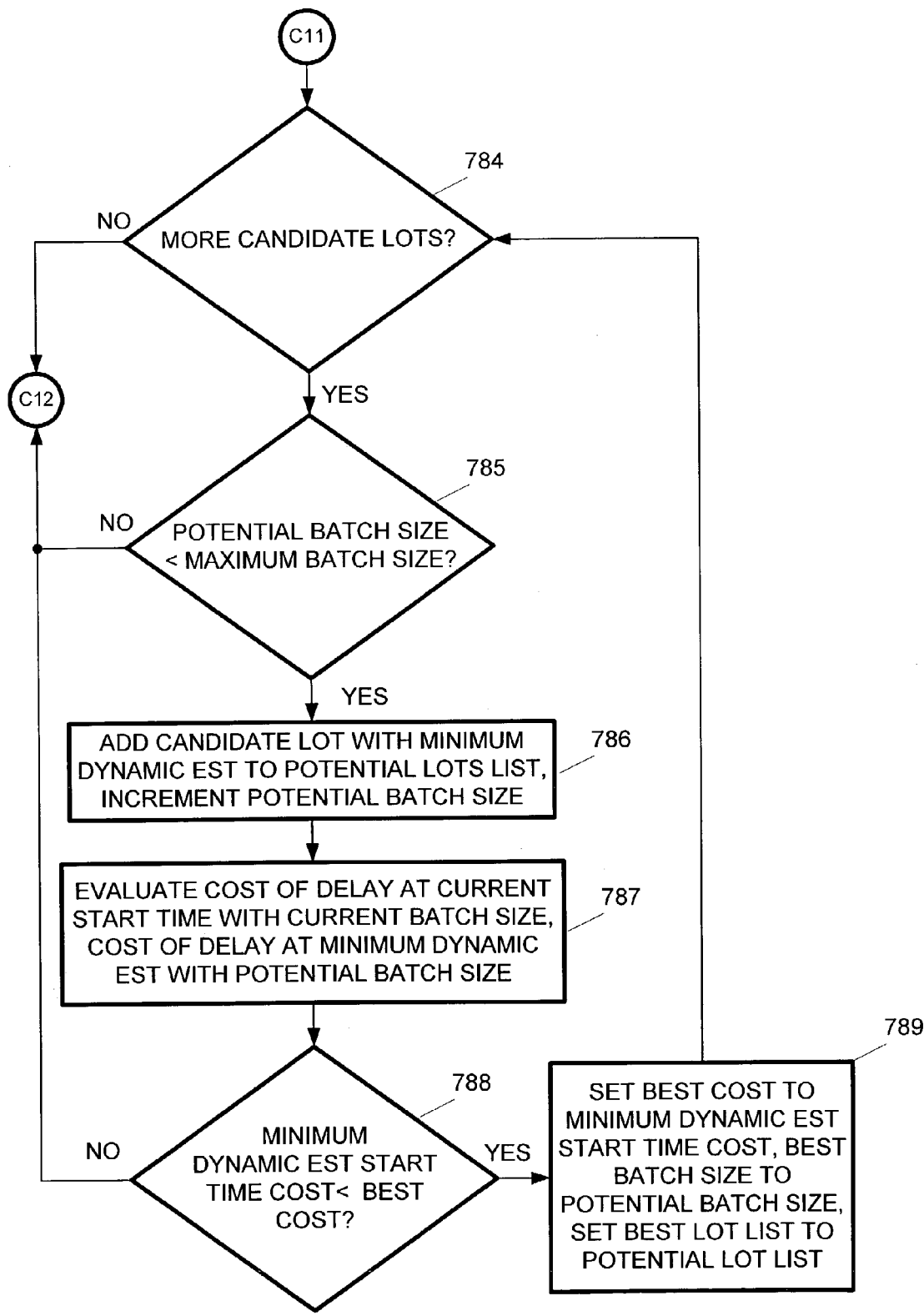

Referring now to FIG. 7J, if there are more candidate lots (at 784) and the potential batch size is less than the maximum batch size (at 785), then the MSA 515 (at 786) adds the candidate lot with the minimum dynamic EST to the potential lots list and increments the potential batch size. The MSA 515 then evaluates (at 787) the cost of delay at the current start time with the current batch size and the cost of delay to the minimum dynamic EST with the potential batch size. If (at 788) the cost of delay to the minimum dynamic EST is less than the best cost, the MSA 515 (at 789) sets the best cost to the cost of delay to the minimum dynamic EST, the best batch size to the potential batch size, and the best lot list to the potential lot list. The MSA 515 loops through this process until there are no more candidate lots (at 784) or the potential batch size equals the maximum batch size (at 785).

Figure 7K:
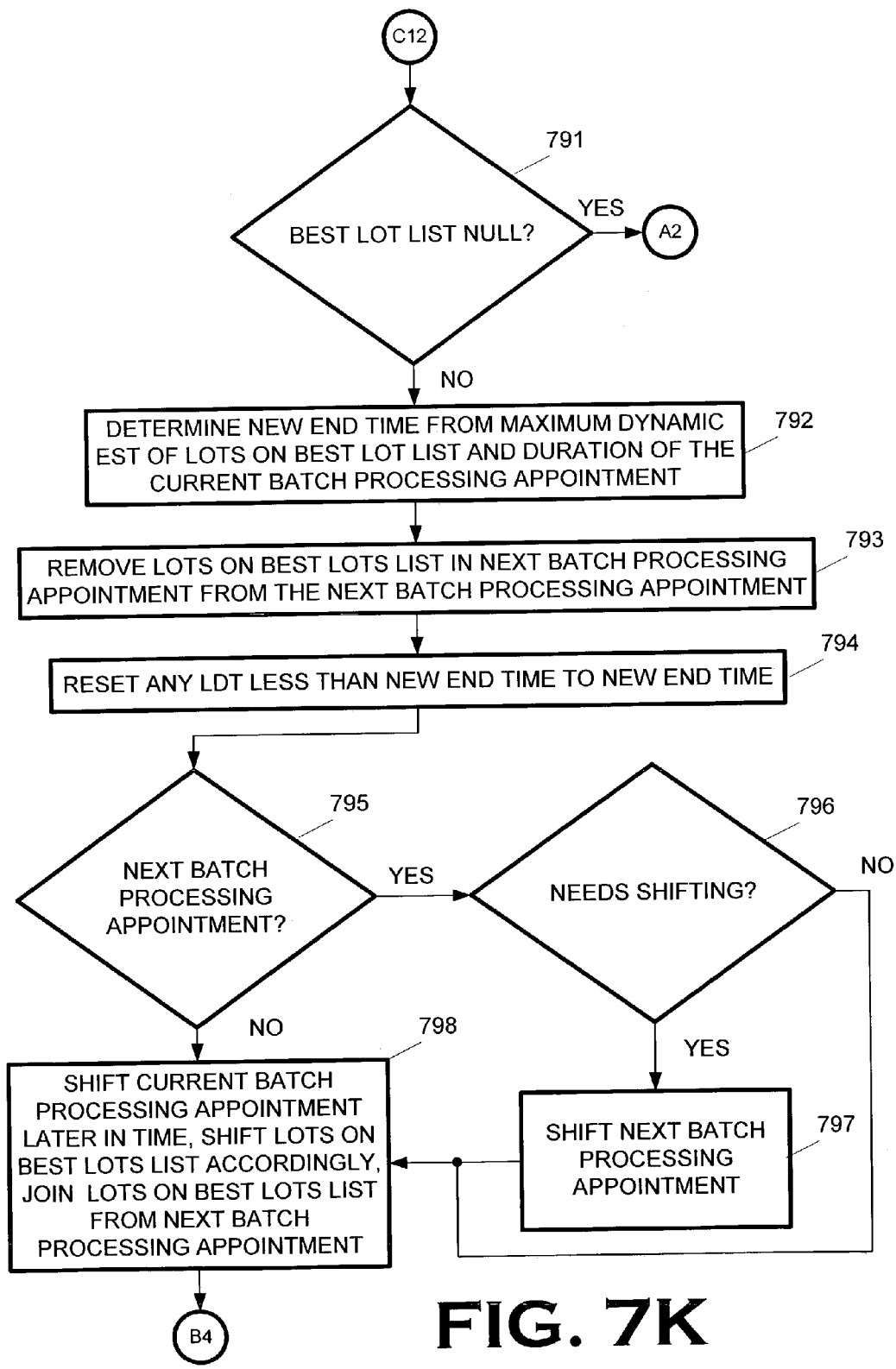

Referring now to FIG. 7K, if there are no more candidate lots (at 784, FIG. 7J), or the potential batch size equals the maximum batch size (at 785, FIG. 7J), the MSA 515 determines (at 791) whether the best lots list is null. If so, then the current batch 500 begins processing (at 412, FIG. 4). If not, the MSA 515 (at 792) determines the new end time for the current batch processing appointment from the maximum dynamic EST of the lots on the best lots list and the duration of the current batch processing appointment. The lots on the best lots list from the next batch 52Q are then removed (at 793) from the next batch 520. (Note that, if the next batch processing appointment is emptied, it is canceled.) The LDT of any lot 134 whose LDT is less than the new end time is then reset (at 794) to the new end time. If there is a next batch processing appointment (at 795) that needs shifting (at 796), the MSA 515 shifts it (at 797). Otherwise, the MSA 515 (at 798) shifts the current batch processing appointment later in time, shifts the lots on the best lots list accordingly, and joins the lots on the best lots list to the current batch processing appointment. If the current batch is not full, the MSA 515 advertises the openings. The MSA 515 waits (at 610, FIG. 6A) for bid requests responding to the advertisement and the arrival of the new start time.

Thus, the decision-making process 400 of whether to start or delay processing a batch 500 in the process flow 505 implementing one particular embodiment of the method 300 in FIG. 3. The process flow 505 is one particular implementation of the process flow 100 in FIG. 1. FIG. 4 illustrates the opening of the decision making process wherein the fullness of the batch and the readiness of its participants direct the rest of the decision making process. FIG. 6A–FIG. 6H illustrate the decision making process if one or more of the participants in the batch is not ready for processing or a lot has requested to shift later in time. FIG. 7A–FIG. 7K illustrate the decision making process if the participants in the batch are ready, but the batch is not full. As was noted earlier, this discussion presents but one manifestation of the decision-making process in the illustrated embodiment, and the invention is not limited thereto.

Figure 6G:
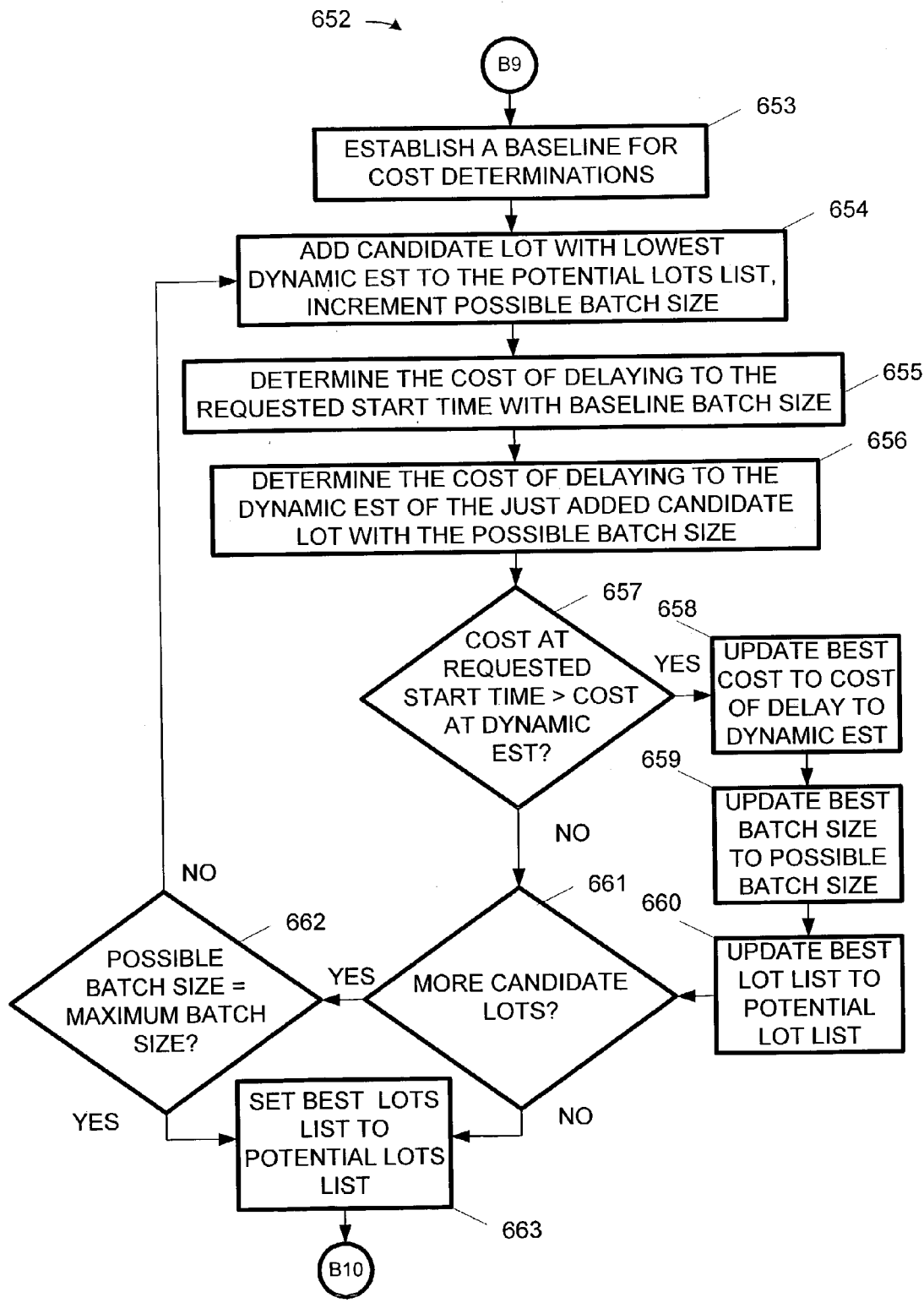
Figure 6H:
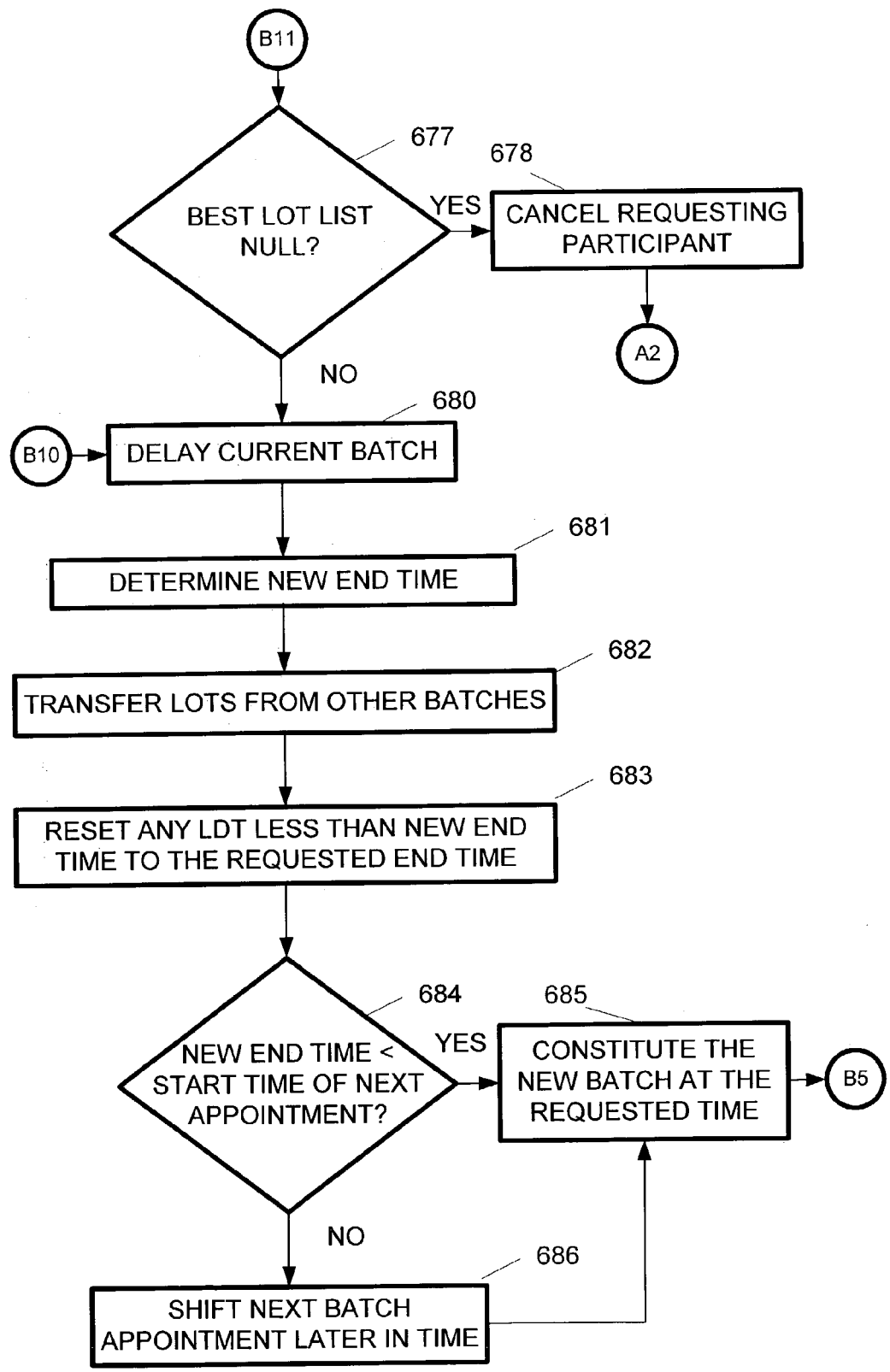

At several points in the description above, the MSA 515 determines the cost of delay at various times (e.g., at 628, FIG. 6D; at 667, 668, FIG. 6F; at 655, 656, FIG. 6G; at 762, FIG. 7G; at 778, FIG. 7I; at 787, FIG. 7J). The MSA 515 also frequently compares the cost of delay at different times (e.g., at 629, FIG. 6D; at 669, FIG. 6F; at 657, FIG. 6G; at 763, FIG. 7G; at 782, FIG. 7I). More technically, in the illustrated embodiment, the MSA 515—implemented as an object in an OOP environment—calls a method that determines the cost of delay. The MSA 515 passes to the method the identity of the current batch 500, the delayed start time, the unready participant 134 (if any), the earliest start time for a the unready participant, if any, that cannot start at the current time, and selected information about candidate lots that may be added from other batches 500. This selected information includes the lot identification, its earliest start time, a tool for calculating the lot's budget, a current start time, the process, and the process operation.

Figure 8:
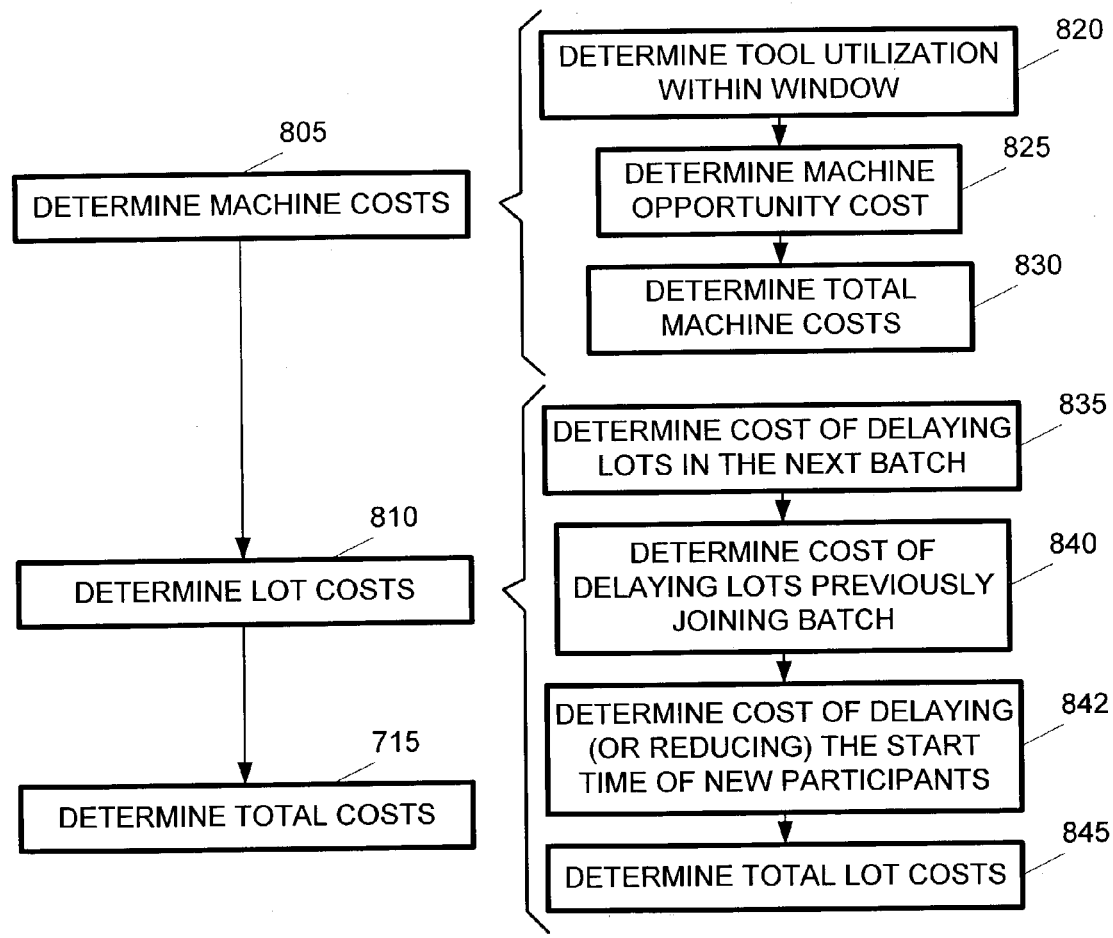
FIG. 8 conceptually illustrates the determination of the cost of delay in the decision-making process.

As shown in FIG. 8, to determine the cost of delay, the method determines the machine costs, as set forth in the box 805; the lot costs, as set forth in the box 810; and from the machine costs and the lot costs, the total costs, as set forth in the box 815. The machine costs may be broken into the cost of waiting (idle time) and the cost of running (running a batch of less than a certain size). Both types of machine costs require the calculation of opportunity costs, as set forth in box 825. Opportunity cost is calculated by determining tool utilization as set forth in box 820. The cost of running and the cost of waiting both result in a type of machine opportunity cost. The cost of waiting and the cost of running are then summed to arrive at the total machine costs, as show in box 830.

The lot costs can be segregated into the cost of delaying lots in the next batch, as set forth in the box 835; the cost of delaying participants 134 previously joining the current batch 500, as set forth in the box 840; and the cost of delaying (or reducing) the start time of the new participants, as set forth in the box 842. The total lot costs are then determined by summing these amounts, as set forth in the box 845. (Note that some lots that can join the batch at the later start time may actually reduce their start time.) The actual determination of these costs in the illustrated embodiment was discussed in full detail above relative to the method 300 of FIG. 3. FIG. 8 therefore illustrates—in general fashion—the determination of the "cost of delay" at a given time with a given batch size and constituency.

In one particular implementation of the illustrated embodiment, in determining whether to start a batch at time $t_0$ or to wait for up to n additional lots $L_i$ that become available at known times $t_i$, where $i=\{1 \ldots n\}$, the MSA 515:

- defines the costs borne by the process tool 117 if it starts the batch at each possible time $t_i$, $i=\{0 \ldots n\}$;
- defines the costs borne by the lots (both those lots 134 in the original batch and lots $L_i$, $i=\{1 \ldots n\}$ which may join the batch as well as lots in future batches that are not joining the batch) whose end times are delayed or accelerated if the batch starts at each time $t_i$, $i=\{0 \ldots n\}$; and
- starts the batch 600 at the $t_i$ for which the total cost (process tool 117 plus lots 132, 134, 136) is least.

To calculate the machine costs (at 805), the utilization of the of the process tool 117 within a representative time window [UTS, UTE] is first determined. The time window [UTS, UTE] must include the current start time $t_0$ as well as the specified time $t_i$ to which the batch 500 may be delayed, and should generally be larger. The illustrated embodiment employs a configurable property "utilization window multiplier," represented as UWM. The UWM provides a value that is multiplied by the duration D of the batch processing appointment to determine the size USIZE of the utilization window:

$$USIZE = UWM * D$$

So, in the illustrated embodiment, the default utilization window starts at time UTS=$t_0$ and ends at time UTE=$t_0$+USIZE. If the calculated UTE<$t_i$, then set UTE=$t_i$ so the utilization window includes the specified time $t_i$. The window size is calculated in milliseconds:

$$windowMillis = UTE - UTS$$

Thus, the utilization window is defined.

The utilization U of the process tool 117 is then determined by examining each appointment that falls within the utilization window. This includes not only processing appointments, but appointments of other types involving the machine, e.g., setup and maintenance appointments. More particularly, a parameter "busytime" is first initialized to 0.0. Next, the first appointment ending after time UTS is identified and its start time TS determined. If there is no such appointment or the appointment's TS≧UTE, then:

$$U = busytime/windowMillis$$

An "overlap time" associated with the appointment is then determined. If TS<UTS, i.e., the appointment overlaps the start of the utilization window, a parameter "overlapStart", defining the start of the preceding overlap period is set to UTS. Otherwise, the overlapStart is set to TS, i.e., the start time of the appointment. Then, the end time TE of the appointment is determined. If TE>UTE, then a parameter "overlapEnd," defining the end of the subsequent overlap period, is set to UTE. Otherwise, overlapEnd is set to TE, i.e., the end time of the appointment. The overlap time for the appointment is then determined in milliseconds:

$$overlapMillis = overlapEnd - overlapStart$$

The busy time for the appointment is then determined (in milliseconds) by multiplying the overlap time by a utilization factor for the appointment type:

$$busyMillis = overlapMillis * utilization\ factor$$

The utilization factor for each appointment type is between 0 and 1. The utilization factor for a batch appointment is the number of participants divided by the maximum batch size. The total busytime for the utilization window is then redetermined:

$$busytime = busytime + busyMillis$$

This process repeats until there is no next appointment or the next appointment's TS>UTE. At the end of the iteration, the utilization factor representing the machine utilization (at 820) for the utilization window is then:

$$U = busytime/windowMillis$$

The machine opportunity cost can then be determined. A configurable property "fab dollar output per hour", has a value represented as $R_B$. For example, if the fab produces one lot per hour and the value of a lot is $ 1M, then $R_B$=$1,000,000. $R_B$ represents the cost of idle time on a bottleneck machine. We then estimate the cost of idle time on this process tool by comparing its utilization U to the average utilization $U_B$ of the bottleneck. A configurable property "bottleneck utilization fraction" provides the value for $U_B$. $U_B$ is a floating point number in the range 0<$U_B$<1.0. The relative utilization $U_R$ of the machine compared to the utilization of the bottleneck $U_B$ then is:

$$U_R = U/U_B$$

The relative opportunity cost R (per hour) for the process tool is determined by multiplying the bottleneck opportunity cost $R_B$ by the relative utilization $U_R$ raised to a configurable power p:

$$R = R_B * U_R^p$$

A configurable property "opportunity cost exponent" provides the value of p. This provides a mechanism for calibrating the opportunity cost of the machine to the opportunity cost of a bottleneck.

The total machine costs at the time to can then be determined. A previously determined "average batch size" is defined for each machine type, represented herein as A. The "time factor" TF, used as described more fully below, for the opportunity cost is then determined in millis as follows:

$$TF = (t_i - t_0) - [(C_i - C_0) * D/A]$$

where $t_i$=potential later start time for the current batch 500;
$t_0$=current start time for the current batch 500;
D=time to run the batch (appointment duration);
A=average batch size defined for the process tool;
$C_i$=potential batch size at time to (note that $C_i$ may be greater than or equal to the current batch size $C_0$ at time to);
$C_0$=current batch size at time $t_0$ Then the total machine costs (at 830) then are:

$$MC = R * (TF/(3600 * 1000))$$

where

R=relative opportunity cost in dollars per hour; and
TF=time factor in milliseconds.

To calculate the cost of delay for the lots, a "Cost of Lateness" function is used, as is described further below. The process, process operation, and appointment duration D for the lot are identified. A "hunger ratio" HR, which is a measure of whether the lot needs to accelerate, decelerate, or maintain its current planned cycle time to the next bottleneck machine, is then determined for the lot. A new end time $TF_{new}$ is then determined for the lot if it starts at time $t_i$ ($TE_{new}=t_i+D$). A new critical ratio $CR_i$, which is a measure of whether the lot will be ahead of, behind, or on schedule to meet its due date, is determined given the process, process operation, new end time $TE_{new}$, and a "critical ratio late threshold," or value the $CR_i$ is divided by for normalization. A normalized critical ratio $CRnorm_i$ is determined by dividing the $CR_i$ by CRLateThreshold, a value determined from a configurable property that depends on the lot's priority:

$CRnorm_i=CR_i/CRLateThreshold$

A composite ratio $CMPR_i$ is then determined from the $CRnorm_i$ and the hunger ratio HR:

$CMPR_i=(Y*CRnorm_i)+(1-Y)*HR$, where Y is a configurable property $0 \leq Y \leq 1$.

If $CRnorm_i<1.0$ and $HR>1.0$, then set a parameter $X_i=CRnorm_i$, otherwise set $X_i=CMPR_i$. The cost of lateness weight for ending at time $TE_{new}=t_i+D$ is:

$CostOfLateness=W(TE_{new})=W(X_i)$ where $W(X_i)$ is a configurable decreasing convex function.

The critical ratio $CR_0$ is then recalculated at time to using the process, process operation and the current end time $TE=t_0+D$. The normalized critical ratio $CRnorm_0$ at time $t_0$ is then calculated using the formula:

$CRnorm_0=CR_0/CRLateThreshold$

The composite ratio $CMPR_0$ is then recalculated at time $t_0$ from $CRnorm_0$ as the critical ratio and HR as the hunger ratio. If $CRnorm_0<1.0$ and $HR>1.0$, then $X_0=CRnorm_0$, otherwise $X_0=CMPR_0$. The cost of lateness function for starting at time $t_0$ is then determined:

$CostOfLateness=W(TE)=W(X_0)$

The change in the cost of lateness, $\Delta COLW$, is calculated by:

$\Delta COLW=CostOfLatenessW(TE_{new})-CostOELateness W(TE)$

In the illustrated embodiment, each lot is assigned a regular budget ("REGB") from which it "pays" for, among other things, processing time on process tools, e.g., the process tools 117, 532. From the regular lot budget REGB and a predetermined property "batch delay cost of lateness factor" COLF, the cost of lateness COL is determined:

$COL=\Delta COLW*REGB*COLF$

The value COL is the cost of lateness for delaying a lot from start time $t_0$ to $t_i$.

The cost of lateness $COL_{t0}$ for lots currently in the batch 500 scheduled to start at time $t_0$ and delayed to start until time $t_i$ can now be determined. For each lot j currently in the batch, calculate the cost of delay ($COL_j$). We then sum the cost of lateness $COL_j$ for all of the lots in the batch currently starting at time $t_0$:

$COL_{t0}=sum(COL_j)$ for all lots j currently in the batch.

Some lots may be added to the batch if it is delayed to start at time $t_i$. These lots may be less late by starting at time $t_i$ then if they start with another batch at time $t_n$. For each lot k added to the batch when it starts at time $t_i$, the cost of lateness $COL_k$ is determined between starting at time $t_i$ (earlier time) and starting at time $t_n$. Since these lots are less late, the change in cost of lateness is given the opposite sign, i.e., it becomes a negative quantity instead of positive. The cost of lateness is summed for all lots k that will be added to the batch at time $t_i$.

$COL_n=sum(-1.0*COL_k)$ for all lots k added to the batch at start time $t_i$

The cost of lots m in the next batch 520 that start later and that will not be added to the current batch 500 if it is delayed to start at time $t_i$ is also considered. These lots cannot start any earlier than $TS_{new}=t_i+D_i$, where $D_i$ is the duration of the batch appointment, and therefore they cannot complete any earlier than $TE_{new}=t_i+D_i+D_n$, where $D_n$ is the duration of the next batch appointment. Compare the new end time $TE_{new}$ of the next batch to the current end time TE of the next batch. If $TE_{new}>TE$, then for each lot m in the next batch that will not be added to the current batch if it starts at time $t_i$, calculate the cost of lateness $COL_m$ for the lot m ending at time TE versus the next batch ending at time $TE_{new}$. We then sum the cost of lateness $COL_m$ for all lots m in the next batch that are delayed:

$COL_m=sum(COL_m)$ for all lots m in the next batch not added to the current batch.

The total lot cost LC is the sum of the all the lot costs calculated for the three types of lots that may be delayed:

$LC=COL_{t0}+COL_{ti}+COL_m$

The total cost of delay incurred in delaying the batch 500 from start time $t_0$ to start time $t_i$ is the sum of the machine costs MC and the lot costs LC:

$DelayCost=MC+LC$

This estimate of the cost of waiting considers only the effect of the delay on the batch immediately after the batch we are currently forming. On a heavily loaded resource, delaying that latter batch may in turn delay subsequent batches, leading to a ripple effect. This ripple effect varies with the distance into the future over which the process tool 117 is committed to specific lots. The ripple effect increases in severity if the time to execute a batch is short in comparison with the time window over which lots look ahead to schedule, but relatively insignificant if the time to execute is long in comparison with look-ahead times.

Also, at several points the MSA 515 finds lots in other batches 500 that can be added to the current batch 500 at certain start times. More technically, the MSA 515 calls another method that compiles the list of other lots, referred to above as "candidate lots." The MSA 515 calls the method and passes it selected information. This information includes the batch processing appointment that may be delayed, any participant in the batch that cannot start at the current start time, the earliest start time of any participant that cannot start at the current start time, the maximum earliest start time for candidate lots (or null, for the default cutoff), and a Boolean value to restrict the search to the next batch processing appointment on the current processing tool or to expand it to other process tools.

Note that, in many cases, information about whether lots on other process tools can be added at a later time will be important to making a good decision about whether to delay processing the current batch processing appointment. Without considering lots on other process tools, a completely different decision could be reached.

Figure 9:
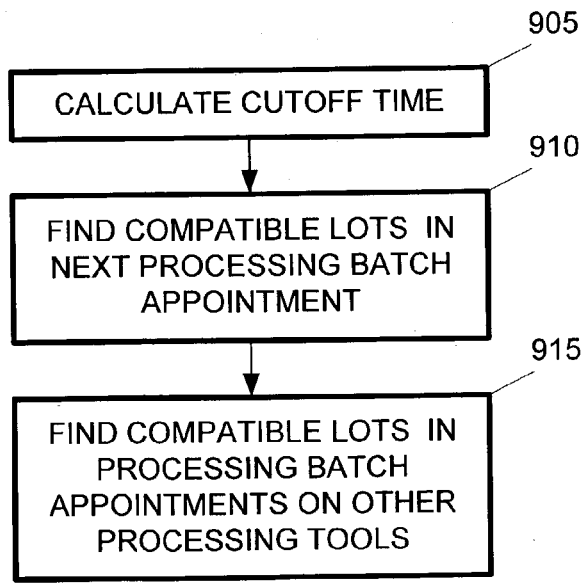
FIG. 9 conceptually illustrates a method by which lots in other batches are located for possible inclusion in the current batch in an attempt to fill out the batch.

FIG. 9 generally illustrates the process by which the MSA 515, through the method mentioned immediately above, identifies the candidate lots. The MSA 515 first determines a "cutoff" time, as set forth in the box 905. The cutoff time is the earliest start time beyond which no more lots 132, 522, 536 will be considered for adding to the current batch 500. In the illustrated embodiment, the cutoff is not always specified, in which case it defaults to a predetermined value. The default cutoff time for the illustrated embodiment is the current start time plus the duration of the current batch processing appointment. Note, however, that other values may be used. For instance, a configurable fraction of the duration may be added to the current start time to obtain the default cutoff time in some embodiments.

Figure 10A:
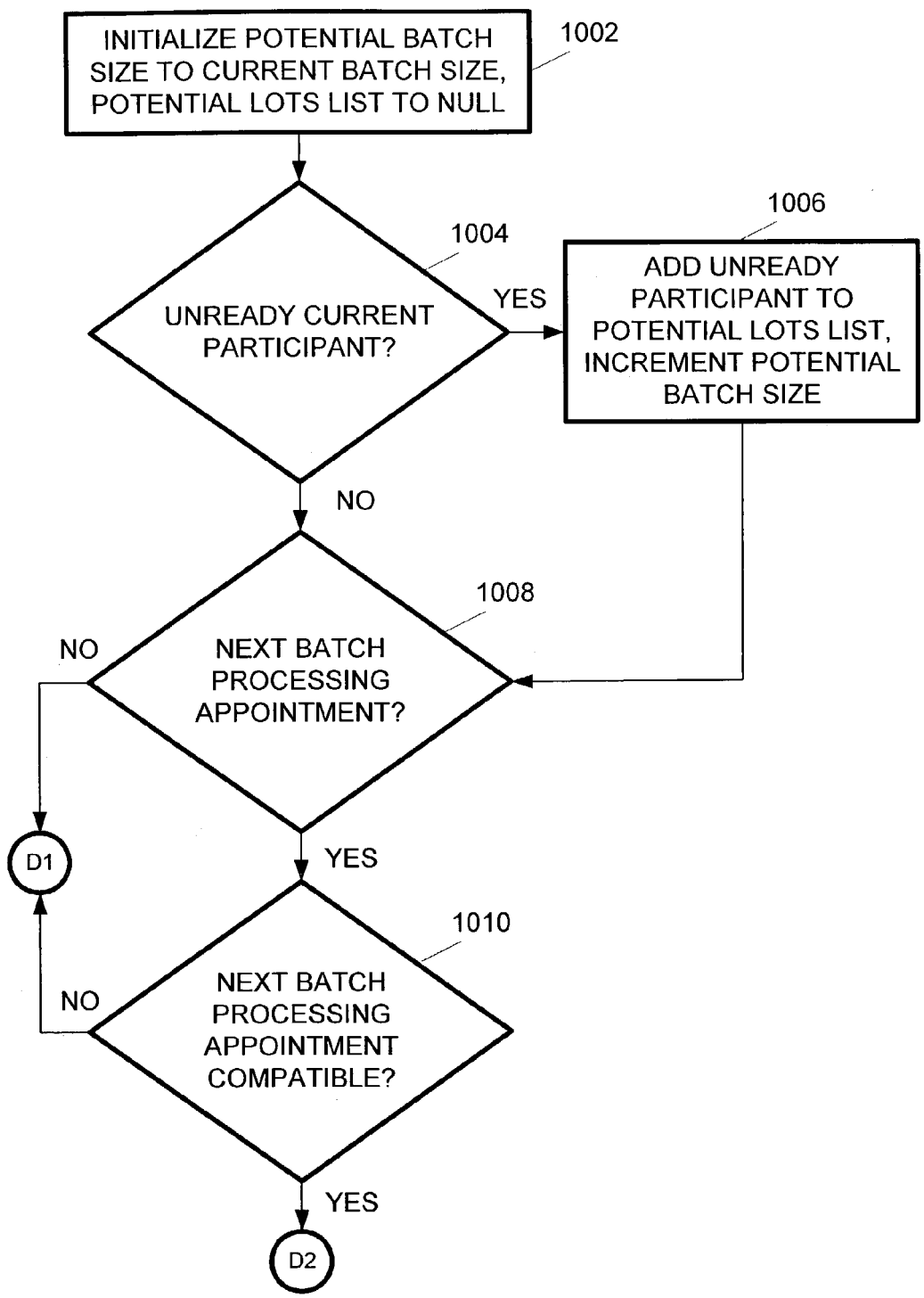
FIG. 10A–10F illustrate a decision-making process employed in the method of FIG. 9 to locate lots in others batches.

The MSA 515 then finds (at 910) one or more compatible lots 522 in the next batch 520 on the processing tool 117. Technically, the MSA 515 does this through the above mentioned method, which in turn calls a second method to perform this task. As shown in FIG. 10A, this second method initializes (at 1002) the potential batch size to the current batch size and initializes the potential lot list to null. If (at 1004) there is a current participant 134 in the current batch 500 that cannot start at the current start time (i.e., an unready participant), it is added (at 1006) to the potential lots list. The second method then determines (at 1008) whether there is a next batch processing appointment and, if so, whether it is compatible (at 1010). If the next batch appointment is incompatible (at 1012), or if there is no next batch processing appointment (at 1014), then the search turns (at 915) to batches 534 on other processing tools 532, as will be discussed further below.

Figure 10B:
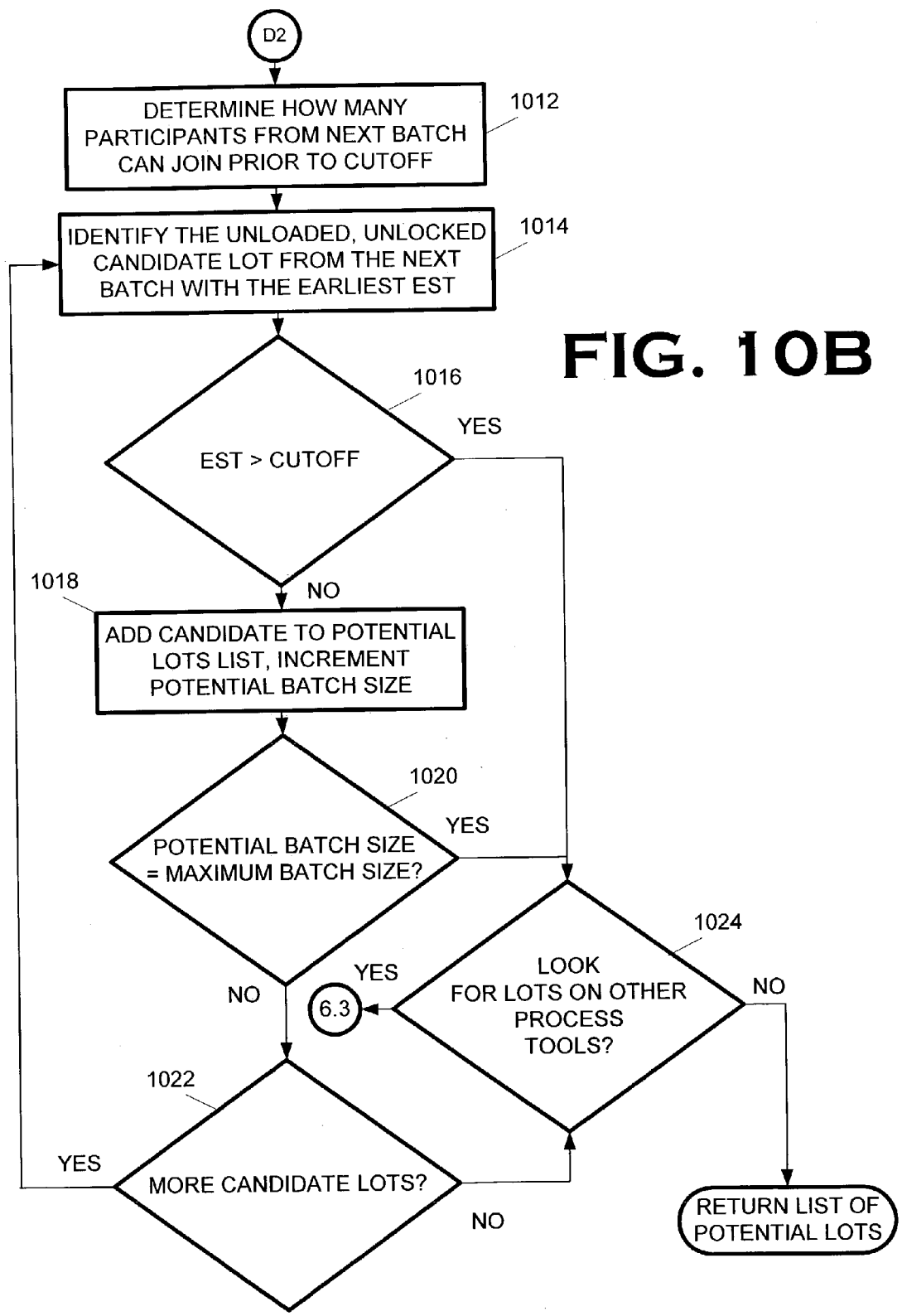

If there is a next batch 520 (at 1008) and that nest batch 520 is compatible (at 1010), then, as shown in FIG. 10B, the second method determines (at 1012) how many participants 522 in the next batch 520 can be added to the current batch 500 before the cutoff time. The second method then (at 1014) identifies the candidate lot from the next batch 520 with the minimum EST that is not locked due to a final move or a load in progress. If this EST is less than or equal to the cutoff (at 1016), then (at 1018) the candidate lot is added to the potential lots list and the potential batch size is incremented. This continues until there are no more candidate lots (at 1022), the earliest EST among the candidate lots is greater than the cutoff (at 1016), or the potential batch size equals the maximum batch size (at 1020). If the Boolean indicates that the MSA 515 is to search for lots 536 on other process tools 532 (at 1024) and the potential batch size is less than the maximum batch size, then the MSA 515, proceeds (at 915, FIG. 9) to look for compatible lots 536 on other process tools 532.

Figure 10C:
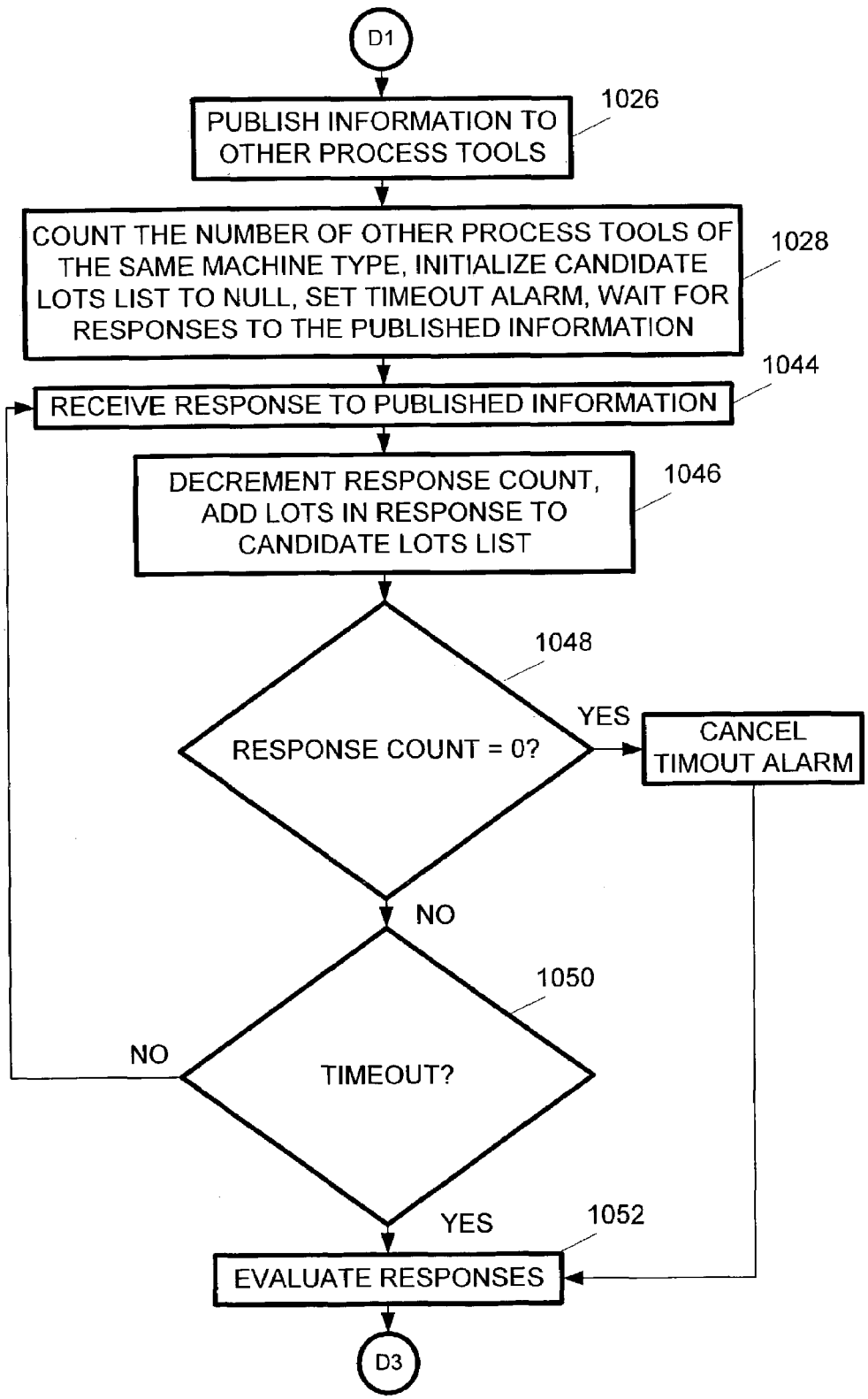

Turning now to FIG. 10C, to find (at 915, FIG. 9) compatible lots 536 on other process tools 532, the MSA 515 calls the second method. The second method publishes (at 1026) selected information regarding the openings in the current batch 500. This information may include the recipe for the process operation, the ERF id, the machine type of the process tool 117, the cutoff time, the end time corresponding to the cutoff time, and the current start time of the current batch processing appointment. The information is published to LSAs 510 of lots that require processing on the same machine type. (Note that, in some embodiments, the information may be published to the machines of the same type.) The method then initializes a candidate lots list to null, sets a timeout alarm, and waits for responses to the published information.

As was alluded to above, each manufacturing domain entity, whether it be a machine, a lot, or a resource, only has at least one concomitant software agent 265 associated therewith. These include, for example, the MSA 515 and the LSAs 510, shown in FIG. 5. The software agents 265 typically employ a variety of "helper class" objects that help them perform their functions. One of these helper class objects is a "listener" (not shown), which listens for information pertinent to the manufacturing domain entity its software agent 265 represents. Listeners of this type receive the information published (at 1026) by the MSA 515, and their associated software agent 265 responds, if desired.

Figure 10D:
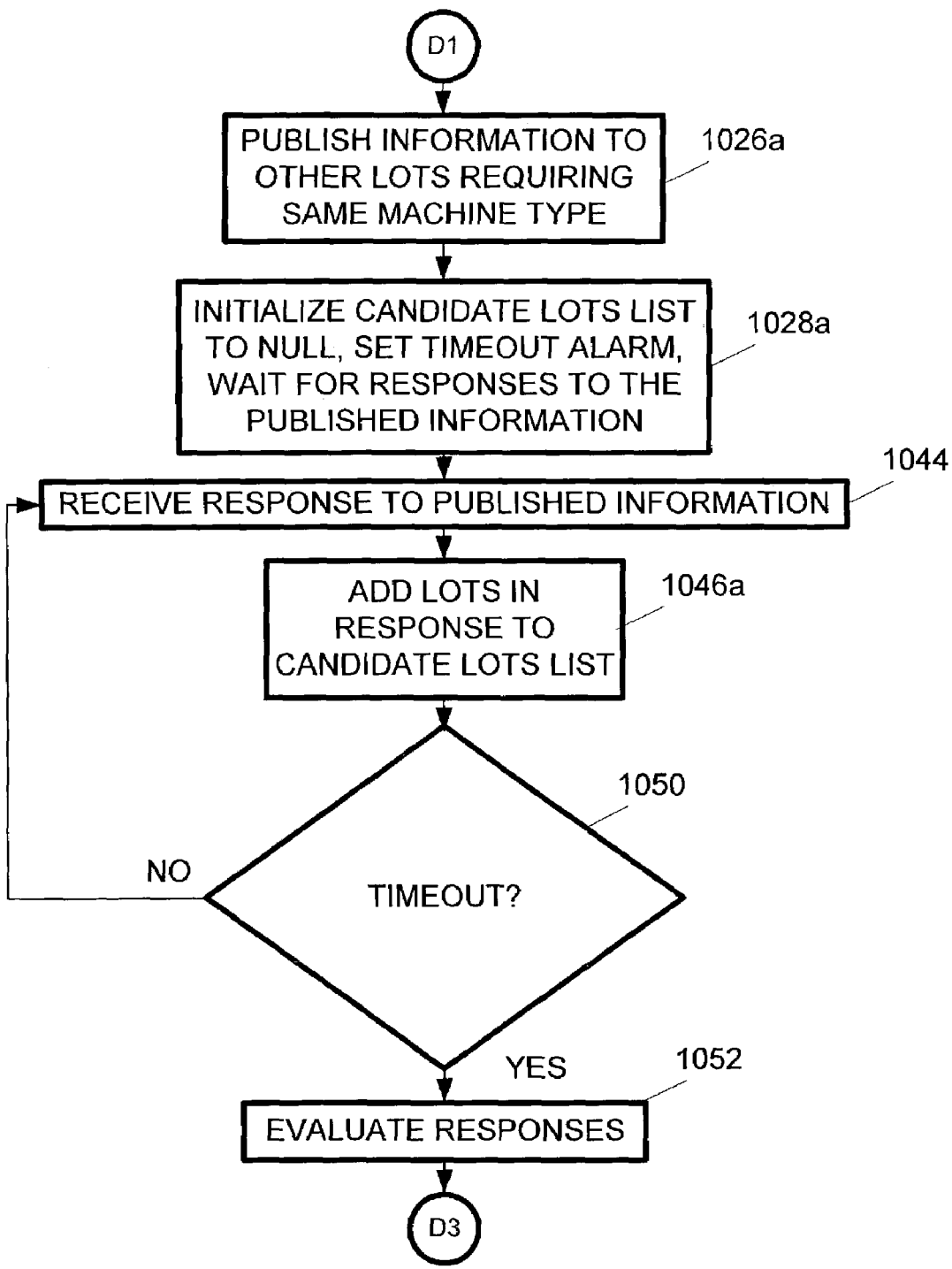

In one embodiment illustrated in FIG. 10D and similar to that shown in FIG. 10C, each relevant LSA 510 receives the published information through a respective listener (not shown). If the LSA 510 currently has an appointment on the same machine type for a compatible batch (i.e., same recipe ERF id, if applicable, and time match) and the appointment is not locked because the final move or loading is in progress or finished, then the LSA 510 may respond. The time matches if the lot could schedule an appointment starting before the cutoff time and ending before the published end time. This is determined by first calculating a potential processing end time for the lot by calculating a new EST for the lot at the advertising machine and adding the processing duration.

If the new EST is earlier than the cutoff time and the calculated processing end time is earlier than the published end time and the LDT is earlier than the publised end time the time matches. In the illustrated embodiment, the LSA 510 also makes sure that the LSA's scheduled end time improves by at least some configurable number of minutes before responding. If the LSA 510 can improve its schedule, the LSA 510 responds to indicate its interest in the published opportunity. If the MSA 515 decides to delay the batch, the MSA 515 re-publishes the information after the batch is shifted and, if all the matches are still true, the LSA 510 cancels the existing appointment and reschedules hoping to win the slot.

Figure 10E:
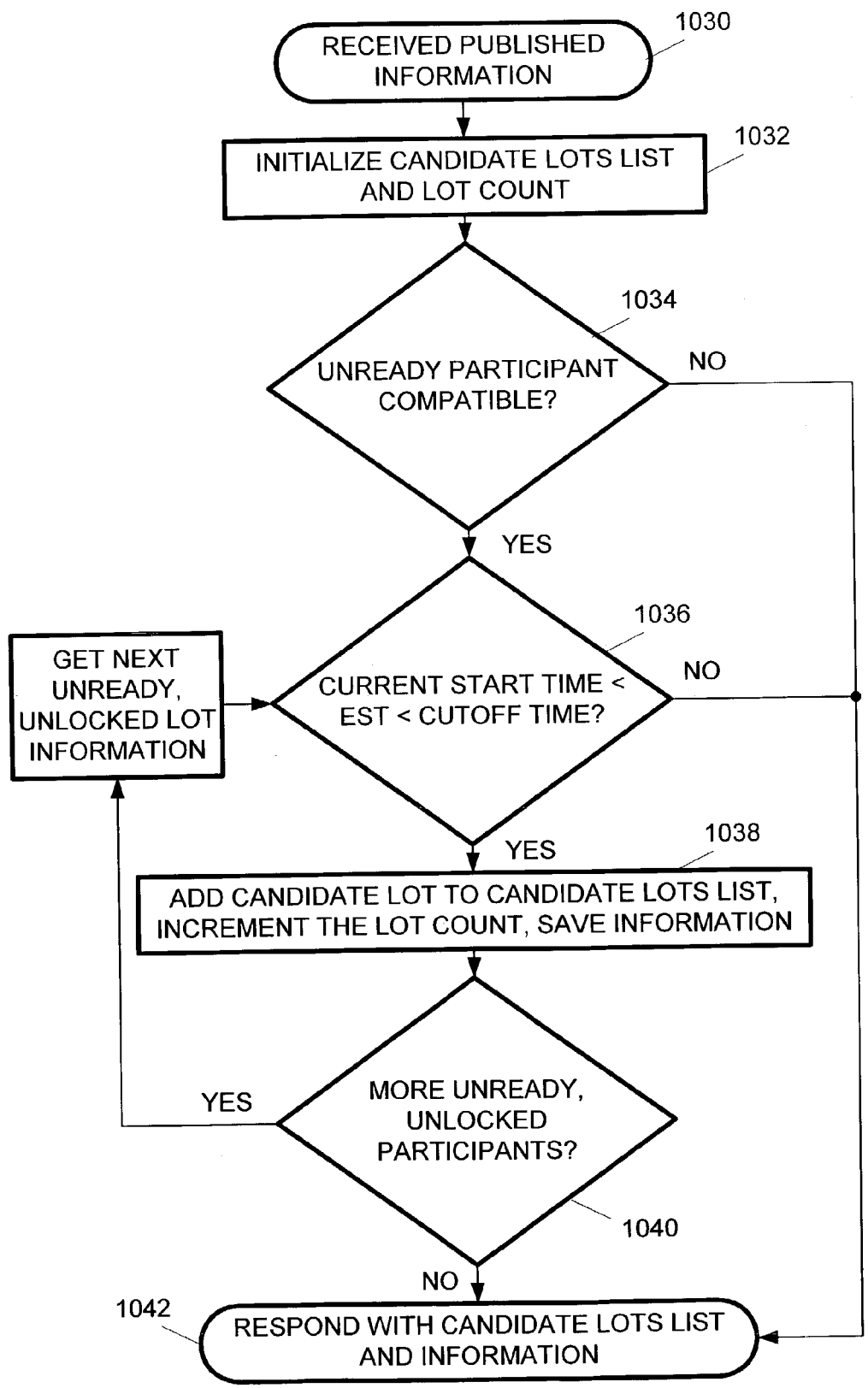

Turning now to FIG. 10E, in an alternative embodiment where the information is published to the MSAs 515, the responding MSA 540, upon receiving the published information (at 1030) through its listener (not shown), initializes (at 1032) its own candidate lot list to null and a lot count to zero. The responding MSA 540 then finds its first unready and unlocked batch appointment starting after the current start time of the current batch 500 trying to be filled. The responding MSA 540 then determines (at 1034) whether the unready and unlocked appointment is compatible with the current batch 500 (e.g., same recipe and ERF Id). If the batch is compatible, the responding MSA 540 cycles through the batch participants 536 that are not ready and are unlocked to locate candidate lots. In this context, "locked" means being ready, loading, or on its final move to the process tool 117.

The responding MSA 540 tests (at 1036) each candidate lot 536 to see if its EST is greater than the current start time of the current batch 500 trying to fill and less than the cutoff time. If so, the responding MSA 540 (at 1038) adds the candidate lot 536 to the candidate lots list, increments the lot count, and saves selected information about the lot 536. The selected information includes, in the illustrated embodiment, the lot, EST, LDT, end time, and the number of lots in the batch 534 in which it is currently participating. If there are no more candidate lots (at 1040), or if the batch 534 is not compatible (at 1034), or if there is no appointment starting after the current start time of the current batch 500 (at 1036), then the responding MSA 540 responds (at 1042) with the candidate lot list and the information is stored about the lots 536 therein. In the illustrated embodiment, the responding MSA 540 responds even if the candidate lots list is still set to null so the publishing MSA 515 will not necessarily have to wait for the timeout to occur.

Returning to FIG. 10C, the publishing MSA 515 receives (at 1044) the responses from either the LSAs 510 or the MSAs 515. Upon receiving each response (at 1044), the publishing MSA 515 (at 1046) adds the candidate lots 522 on the received candidate lots list to its own candidate lots list and decrements the response count. This continues until all anticipated responses are received (at 1048) or the timeout occurs (at 1050). If the LSAs 510 are responding, the MSA 515 does not know the number of anticipated responses, so it waits for a timeout alarm. The publishing MSA 515 then begins evaluating the responses (at 1052).

Figure 10F:
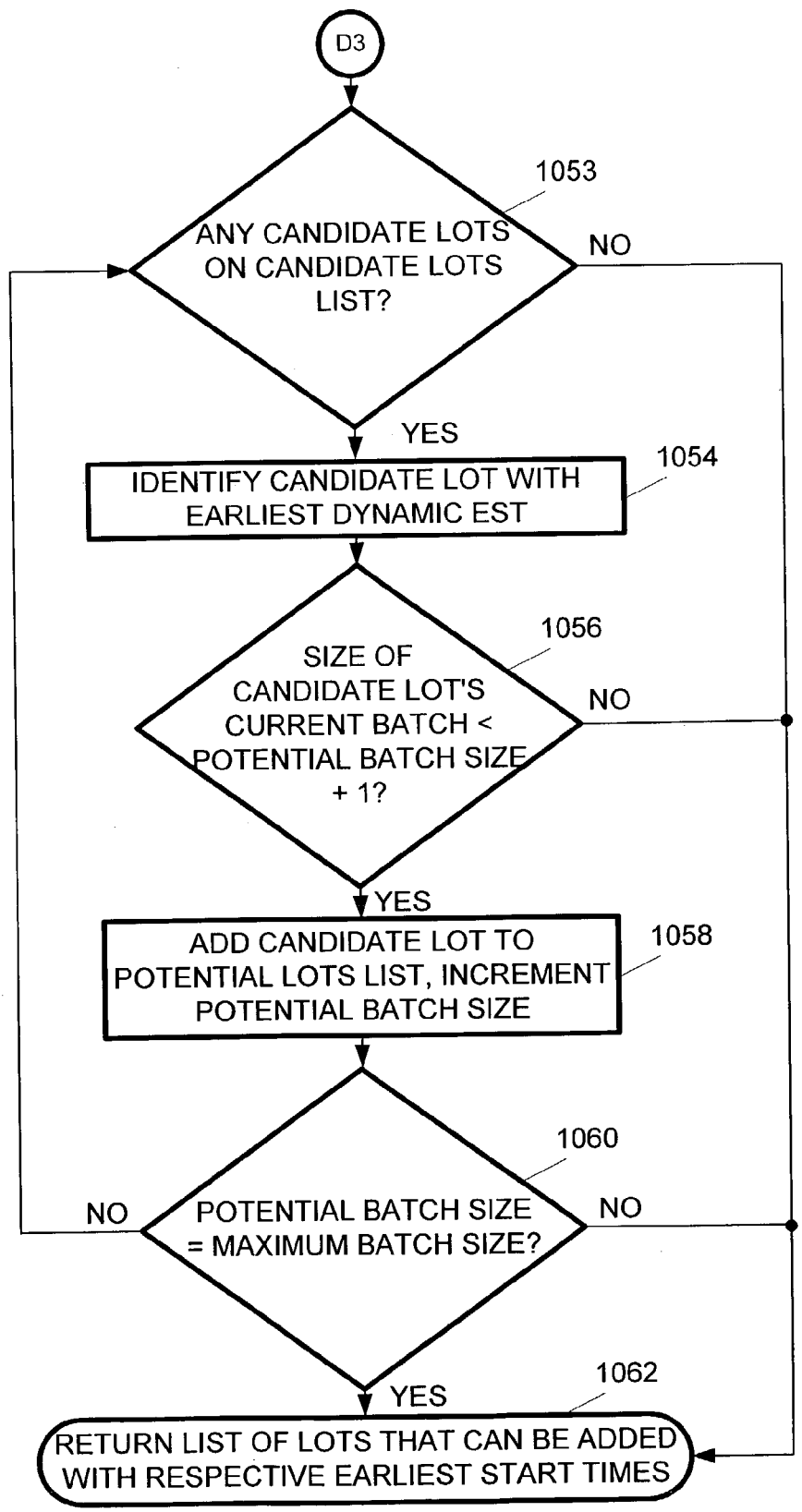

As shown in FIG. 10F, if there are any candidate lots on the candidate lots list (at 1053), the MSA 515 begins the evaluation by identifying (at 1054) the lot in the candidate lots list with the earliest dynamic EST. Note that the candidate lots list was compiled as the responses were received as was discussed above. If (at 1056) the size of the candidate lot's batch 534 is less than the potential batch size if the candidate lot were added to the current batch 500, then (at 1058) the candidate lot is added to the potential lots list and the potential batch size is incremented. If the potential batch size is less than the maximum batch size (at 1060) and there are more candidate lots (at 1053), the MSA 515 continues to cycle through the candidate lots list. If the potential batch size equals the maximum batch size (at 1060), then the list of lots that can be added is returned to the MSA 515 along with the respective earliest start times for those lots.

This concludes the detailed description. The particular embodiments disclosed above are illustrative only, as the invention may be modified and practiced in different but equivalent manners apparent to those skilled in the art having the benefit of the teachings herein. For instance, in some embodiments, a start time may be shifted greater than the to amount requested by an unready lot if it permits filling the batch in a desirable way. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for determining whether to delay processing a batch, the method comprising:
    ascertaining a respective time at which each of a plurality of additional lots will be received into the batch, the batch including a plurality of present lots;
    assessing a cost for a machine, each additional lot, and each present lot for each respective time at which each additional lot will be received should the machine begin processing the batch at the respective time; and
    determining the respective time at which the total cost borne by the machine, each additional lot, and each present lot will be at a minimum.

2. The method of claim 1, wherein there is a future batch scheduled for the machine and assessing a cost for each present lot for each respective time at which each additional lot could be received includes assessing the cost for each lot in the future batch.

3. The method of claim 1, wherein assessing the cost for the machine at each respective time includes assessing a cost for waiting until the respective time and a cost for processing at the respective time.

4. The method of claim 3, wherein assessing the cost for waiting and the cost for processing at the respective time includes assessing a cost per unit time.

5. The method of claim 4, wherein assessing the opportunity cost per unit time is a function of the utilization of the machine within a time window, the planned utilization of a bottleneck machine, and the value of the factory output per unit time.

6. The method of claim 3, wherein assessing the cost for processing at the respective time is a function of the change in the batch size, the time duration for running a batch, the average batch size, and the opportunity cost per unit time.

7. The method of claim 1, wherein assessing a cost for a lot at a respective time is a function of a decreasing convex cost of lateness function, a lot budget, and a cost of lateness factor.

8. The method of claim 1, further comprising iterating the determination of when to begin processing.

9. A method for determining whether to begin processing a batch, the method comprising:
    ascertaining a time $t_i$ at which each of N lots $L_i$ will become available, where $1 \leq i \leq N$;
    assessing a cost borne by a machine at each time $t_i$ should the machine begin processing the batch at the respective time $t_i$;
    assessing a cost borne by each of the lots $L_i$ at each time $t_i$ should the machine begin processing the batch at the respective time $t_i$;
    assessing a cost borne by each of a plurality of lots $L_x$ originally in the batch at each time $t_i$ should the machine begin processing the batch at the respective time $t_i$; and
    determining the time $t_i$ at which the total cost borne by the machine, by the lots $L_i$, and by the lots $L_x$ is least.

10. The method of claim 9, further comprising assessing a cost for each lot Li in a future batch on the machine at each respective time at which each additional lot could be received in a current batch and adding these costs to the total cost when determining the respective time when the total cost will be a minimum.

11. The method of claim 9, wherein assessing the cost for the machine at each $t_i$ includes assessing a cost for waiting until the $t_i$ and a cost for processing at the $t_i$.

12. The method of claim 11, wherein assessing the cost for waiting and the cost for processing at the time $t_i$ includes assessing a cost per unit time.

13. The method of claim 12, wherein assessing the opportunity cost per unit time is a function of the utilization of the machine within a time window, the planned utilization of a bottleneck machine, and the value of the factory output per unit time.

14. The method of claim 11, wherein assessing the cost for processing at the respective time is a function of the change in the batch size, the time duration for running batch, the average batch size, and the opportunity cost per unit time.

15. The method of claim 9, wherein assessing a cost for a lot at a respective time is a function of a decreasing convex cost of lateness function, a lot budget, and a cost of lateness factor.

16. The method of claim 9, further comprising iterating the determination of when to begin processing.

17. A manufacturing process flow, comprising:
a processing tool that processes batch-by-batch;
a batch of present lots;
a plurality of additional lots that may be included in the batch; and
a software agent capable of:
ascertaining a respective time at which each of the additional lots may be received into the batch, the batch including a plurality of present lots;
assessing a cost for the processing tool, each additional lot, and each present lot for each respective time at which each additional lot will be received should the processing tool begin processing the batch at the respective time; and
determining the respective time at which the total cost borne by the processing tool, each additional lot, and each present lot will be at a minimum.

18. The manufacturing process flow of claim 17, wherein there is a future batch scheduled for the tool and assessing a cost for each present lot for each respective time at which each additional lot could be received includes assessing the cost for each lot in the future batch.

19. The manufacturing process flow of claim 17, wherein assessing the cost for the tool at each respective time includes assessing a cost for waiting until the respective time and a cost for processing at the respective time.

20. The manufacturing process flow of claim 19, wherein assessing the cost for waiting and the cost for processing at the respective time includes assessing a cost per unit time.

21. The manufacturing process flow of claim 17, wherein assessing a cost for a lot at a respective time is a function of a decreasing convex cost of lateness function, a lot budget, and a cost of lateness factor.

22. The manufacturing process flow of claim 17, wherein the software agent is further capable of iterating the determination of when to begin processing.

23. The manufacturing process flow of claim 17, wherein the processing tool is selected from the group consisting of a fabrication tool and a metrology tool.

24. The manufacturing process flow of claim 17, wherein the software agent comprises an object implemented using an object-oriented programming technique.

25. The manufacturing process flow of claim 17, wherein the additional lots and the present lots comprise lots of semiconducting wafers.

26. A manufacturing process flow, comprising:
a processing tool that processes batch-by-batch;
a batch of present lots;
a plurality of additional lots that may be included in the batch; and
a computing system including at least one computing device programmed to:
ascertain a respective time at which each of the additional lots may be received into the batch, the batch including a plurality of present lots;
assess a cost for the processing tool, each additional lot, and each present lot for each respective time at which each additional lot will be received should the processing tool begin processing the batch at the respective time; and
determine the respective time at which the total cost borne by the processing tool, each additional lot, and each present lot will be at a minimum.

27. The manufacturing process flow of claim 26, wherein there is a future batch scheduled for the tool and assessing a cost for each present lot for each respective time at which each additional lot could be received includes assessing the cost for each lot in the future batch.

28. The manufacturing process flow of claim 26, wherein assessing the cost for the tool at each respective time includes assessing a cost for waiting until the respective time and a cost for processing at the respective time.

29. The manufacturing process flow of claim 26, wherein assessing the cost for waiting and the cost for processing at the respective time includes assessing a cost per unit time.

30. The manufacturing process flow of claim 26, wherein assessing a cost for a lot at a respective time is a function of a decreasing convex cost of lateness function, a lot budget, and a cost of lateness factor.

31. The manufacturing process flow of claim 26, wherein the computing device is further capable of periodically reassessing the determination of when to begin processing.

32. The manufacturing process flow of claim 26, wherein the processing tool is selected from the group consisting of a fabrication tool and a metrology tool.

33. The manufacturing process flow of claim 26, wherein the computing system is selected from the group consisting of a local area network, a wide area network, a system area network, an intranet, or a portion of the Internet.

34. The manufacturing process flow of claim 26, wherein the additional lots and the present lots comprise lots of semiconducting wafers.

* * * * *